US010035955B2

(12) United States Patent
Ogawa et al.

(10) Patent No.: US 10,035,955 B2
(45) Date of Patent: *Jul. 31, 2018

(54) LIQUID-CRYSTAL DISPLAY ELEMENT

(71) Applicant: DIC Corporation, Tokyo (JP)

(72) Inventors: Shinji Ogawa, Kita-adachi-gun (JP); Yoshinori Iwashita, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 28 days.

This patent is subject to a terminal disclaimer.

(21) Appl. No.: 15/329,422

(22) PCT Filed: Jul. 23, 2015

(86) PCT No.: PCT/JP2015/070949
§ 371 (c)(1),
(2) Date: Jan. 26, 2017

(87) PCT Pub. No.: WO2016/017520
PCT Pub. Date: Feb. 4, 2016

(65) Prior Publication Data
US 2017/0210985 A1  Jul. 27, 2017

(30) Foreign Application Priority Data
Jul. 29, 2014  (JP) .................................. 2014-153827

(51) Int. Cl.
G02F 1/1333 (2006.01)
C09K 19/30 (2006.01)
G02F 1/1368 (2006.01)
G02F 1/1362 (2006.01)
G02F 1/1343 (2006.01)
G02F 1/1337 (2006.01)

(52) U.S. Cl.
CPC ........ *C09K 19/3003* (2013.01); *G02F 1/1337* (2013.01); *G02F 1/1368* (2013.01); *G02F 1/13439* (2013.01); *G02F 1/134309* (2013.01); *G02F 1/136286* (2013.01); *C09K 2019/301* (2013.01); *C09K 2019/3004* (2013.01); *C09K 2019/3009* (2013.01); *C09K 2019/3016* (2013.01); *G02F 2001/133738* (2013.01); *G02F 2201/121* (2013.01); *G02F 2201/123* (2013.01)

(58) Field of Classification Search
CPC ........ C09K 19/3003; C09K 2019/3004; C09K 2019/3009; C09K 2019/301; C09K 2019/3016; G02F 1/1333; G02F 1/1368; G02F 1/136286; G02F 1/13439; G02F 1/1337; G02F 1/134309; G02F 2001/133738; G02F 2201/121; G02F 2201/123
USPC ..................... 252/299.01; 428/1.1
See application file for complete search history.

(56) References Cited

U.S. PATENT DOCUMENTS

| 6,497,828 | B1 | 12/2002 | Hirschmann et al. |
| 9,376,618 | B2* | 6/2016 | Ogawa .................. C09K 19/12 |
| 9,464,229 | B2* | 10/2016 | Kurisawa ............... C09K 19/42 |
| 2001/0010576 | A1 | 8/2001 | Lee et al. |
| 2001/0048501 | A1 | 12/2001 | Kim et al. |
| 2003/0117558 | A1 | 6/2003 | Kim et al. |
| 2008/0239181 | A1 | 10/2008 | Jin |
| 2008/0308768 | A1 | 12/2008 | Klasen-Memmer et al. |
| 2009/0268150 | A1 | 10/2009 | Hattori et al. |
| 2009/0309066 | A1 | 12/2009 | Klasen-Memmer et al. |
| 2010/0252777 | A1 | 10/2010 | Klasen-Memmer et al. |
| 2011/0116017 | A1 | 5/2011 | Gere |
| 2011/0193020 | A1 | 8/2011 | Klasen-Memmer et al. |
| 2012/0261614 | A1 | 10/2012 | Goto et al. |
| 2012/0268706 | A1 | 10/2012 | Goebel et al. |
| 2012/0326084 | A1 | 12/2012 | Klasen-Memmer et al. |

(Continued)

FOREIGN PATENT DOCUMENTS

| CN | 101276106 A | 10/2008 |
| CN | 103476905 A | 12/2013 |
| JP | 11-202356 A | 7/1999 |
| JP | 2002-31812 A | 1/2002 |

(Continued)

OTHER PUBLICATIONS

International Search Report dated Oct. 20, 2015, issued in counterpart International Application No. PCT/JP2015/070949 (2 pages).
Park et al., "Comparison of the Process Margin between FFS and IPS mode", Proceedings of the 18th International Display Workshops, Dec. 9, 2011, vol. 3, pp. 1561-1562, ISSN: 1883-2490 (2 pages).

(Continued)

*Primary Examiner* — Geraldina Visconti
(74) *Attorney, Agent, or Firm* — Westerman, Hattori, Daniels & Adrian, LLP

(57) ABSTRACT

The present invention provides a liquid crystal display element that exhibits a large potential-difference gradient due to inter-electrode distance in FFS mode or the like and contains one or more compounds selected from the group of compounds represented by General Formula (I) and one or more compounds selected from the group of compounds represented by General Formula (II). The liquid crystal display element of the present invention provides a liquid crystal display element which uses a liquid crystal composition with negative dielectric anisotropy and makes it possible to realize excellent display characteristics such as flicker when used in a liquid crystal display element that exhibits a large potential-difference gradient due to interelectrode distance in FFS mode or the like, without deteriorating the burn-in characteristics of the display element or various liquid crystal-display-element characteristics such as dielectric anisotropy, viscosity, maximum nematic-phase temperature, nematic-phase stability at low temperatures, or $\gamma 1$.

7 Claims, 4 Drawing Sheets

(56) References Cited

U.S. PATENT DOCUMENTS

| | | | |
|---|---|---|---|
| 2013/0183460 A1 | 7/2013 | Klasen-Memmer et al. | |
| 2013/0207039 A1 | 8/2013 | Hattori et al. | |
| 2015/0070646 A1 | 3/2015 | Kim et al. | |
| 2015/0275089 A1 | 10/2015 | Katano et al. | |
| 2016/0252784 A1* | 9/2016 | Ogawa .................. | C09K 19/12 349/43 |

FOREIGN PATENT DOCUMENTS

| | | |
|---|---|---|
| JP | 2003-233083 A | 8/2003 |
| JP | 2010-503733 A | 2/2010 |
| JP | 2010-242086 A | 10/2010 |
| JP | 2010-535910 A | 11/2010 |
| JP | 2013-250476 A | 12/2013 |
| KR | 2012-0120992 A | 11/2012 |
| TW | 200808943 A | 2/2008 |
| TW | 200819520 A | 5/2008 |
| TW | 200918646 A | 5/2009 |
| WO | 2012/053323 A1 | 4/2012 |
| WO | 2012/144321 A | 10/2012 |
| WO | 2014/069550 A1 | 5/2014 |

OTHER PUBLICATIONS

Seen et al., "A New Liquid Crystal Fringe-Field Switching Device with Superior Outdoor Readability", Japanese Journal of Applied Physics, Aug. 2010, vol. 49, No. 8 Part 1, pp. 084302-1-084302-3, ISSN: 00214922 (3 pages).

Kim et al., "Dynamic Stability of the Fringe-Field Switching Liquid Crystal Cell Depending on Dielectric Anisotropy of a Liquid Crystal", Japanese Journal of Applied Physics, May 1, 2003, vol. 42 Part 1, No. 5A, pp. 2752-2755, ISSN: 00214922 (4 pages).

Decision to Grant a Patent dated May 13, 2014, issued in JP2014-512575, with translation.

Decision to Grant a Patent dated May 13, 2014, issued in JP2014-512576, with translation.

Written Opinion of the International Searching Authority dated Dec. 10, 2013, issued in PCT/JP2013/076805.

Written Opinion of the International Searching Authority dated Dec. 10, 2013, issued in PCT/JP2013/076806.

Young Jin Lim et al., "High performance transflective liquid crystal display associated with fringe-field switching device" Optics Express, 2011, vol. 19, No. 9, pp. 8085-8091.

Internation Search Report dated Dec. 10, 2013, issued in PCT/JP2013/076806.

Internation Search Report dated Dec. 10, 2013, issued in PCT/JP2013/076805.

Non-Final Offce Action dated Jun. 3, 2015 issued in U.S. Appl. No. 14/405,353.

Notice of Allowance dated Nov. 23, 2015 issued in U.S. Appl. No. 14/405,353.

Notice of Allowance dated Mar. 7, 2016 issued in co-pending U.S. Appl. No. 14/405,353.

Non-Final Office Action dated Mar. 7, 2016, issued in U.S. Appl. No. 14/405,357.

Notice of Allowance dated Jul. 12, 2016, issued in U.S. Appl. No. 14/405,057.

Non-Final Office Action dated May 15, 2017, issued in U.S. Appl. No. 15/150,740.

Final Office Action dated Nov. 27, 2017, issued in U.S. Appl. No. 15/150,740.

* cited by examiner

RUBBING DIRECTION

LIQUID-CRYSTAL DISPLAY ELEMENT

TECHNICAL FIELD

The present invention relates to a liquid crystal display device using a nematic liquid crystal composition having negative dielectric anisotropy, which has high transmittance and a high opening ratio.

BACKGROUND ART

From the fact that display quality is excellent, active matrix type liquid crystal display elements have been put on the market for portable terminals, liquid crystal televisions, projectors, computers and the like. In the active matrix type elements, thin film transistors (TFT), metal-insulator-metals (MIM), or the like are used for each pixel, and it is important that the liquid crystal compound or the liquid crystal composition used in this type has a high voltage holding ratio. In addition, a liquid crystal display element which includes a Vertical Alignment (VA) mode, an In-Plane Switching (IPS) mode, and an Optically Compensated Bend, Optically Compensated Birefringence (OCB) mode in combination is proposed in order to obtain wider viewing angle characteristics, and an Electrically Controlled Birefringence (ECB) mode reflective liquid crystal display element is proposed in order to obtain a brighter display. To comply with such liquid crystal display elements, new liquid crystal compounds or liquid crystal compositions are currently being proposed.

At present, as the liquid crystal display for smartphones, a fringe field switching mode liquid crystal display device (FFS mode liquid crystal display device) having high quality and excellent visual characteristics, which is a type of an IPS mode liquid crystal display element, is widely used (refer to PTLs 1 and 2). The FFS mode is a mode introduced for improving the low opening ratio and transmittance of the IPS mode, and as the liquid crystal composition used, a material using a p-type liquid crystal composition having positive dielectric anisotropy is widely used from the viewpoint of easily lowering a voltage. In addition, with respect to the FFS mode display element for portable terminals, there is a strong demand for more power saving, and liquid crystal element manufacturers are continuing to carry out active development in this regard, such as adoption of arrays using IGZO.

On the other hand, currently, it is also possible to improve the transmittance by changing a liquid crystal material currently using a p-type material to an n-type material having negative dielectric anisotropy (refer to PTL 3). This is because the FFS mode does not produce a perfect parallel electric field unlike the IPS mode, and in the case of using the p-type material, the liquid crystal molecules close to the pixel electrode tilt along the fringe electric field of the major axis of the liquid crystal molecules, thereby deteriorating the transmittance. On the other hand, in the case of using the n-type liquid crystal composition, since the polarization direction of the n-type composition is the minor axis direction of the molecules, the influence of the fringe electric field simply rotates the liquid crystal molecules along the major axis and the major axis of the molecule is maintained in a parallel arrangement, so that the transmittance does not decrease.

However, although an n-type liquid crystal composition is typical as a liquid crystal composition for VA, the VA mode and the FFS mode are different in all the points of orientation direction, electric field direction, and required optical characteristics. Further, liquid crystal display elements typified by the FFS mode are characterized by the structure of the electrodes as described later, the minimum value of an inter-electrode distance Rh in the horizontal direction between the pixel electrode and the common electrode is 0 and, even when the inter-electrode distance of vertical components Rv is added, the inter-electrode distance is as small as only the film thickness of the insulating film of the pixel electrode and the common electrode. Since the application voltage E has no large differences depending on the display element, the partial potential difference gradient is very large due to the small inter-electrode distance. In contrast, in the VA mode, since the common electrode and the pixel electrode have electrodes on both of the two substrates, the distance between the two electrodes does not become smaller than the cell gap of the liquid crystal cell. Accordingly, the potential difference gradient in the VA mode differs in that it is larger than that of the FFS mode display elements or the like in which the inter-electrode distance is small. The magnitude of the potential difference gradient due to the inter-electrode distance has a large influence on the design of the display element, and nothing is known about problems such as burn-in or drip mark for which it is difficult to predict the effects from the related art. Accordingly, even if the liquid crystal composition used for VA is simply used for this purpose, it is difficult to form a high-performance liquid crystal display element as required today, and there is a demand to provide an n-type liquid crystal composition optimized for a display element having a large potential difference gradient due to the distance between electrodes in the FFS mode or the like.

CITATION LIST

Patent Literature

PTL 1: JP-A-11-202356
PTL 2: JP-A-2003-233083
PTL 3: JP-A-2002-31812

SUMMARY OF INVENTION

Technical Problem

The problem of the present invention is to provide a liquid crystal display element using an n-type liquid crystal composition which is excellent as a liquid crystal display element such as dielectric anisotropy ($\Delta\varepsilon$), viscosity ($\eta$), nematic phase-isotropic liquid transition temperature ($T_{NI}$), nematic phase stability at low temperature, rotational viscosity ($\gamma_1$), and the like, and which is able to realize excellent display characteristics by being used in a liquid crystal display element with a large potential difference gradient due to the distance between electrodes in FFS mode or the like.

Solution to Problem

In order to solve the above-described problems, the inventors of the present invention conducted intensive studies and found that, as a result of examining the configuration of various kinds of liquid crystal compositions optimal for a liquid crystal display element having a large potential difference gradient due to the distance between electrodes in FFS mode or the like, a liquid crystal composition containing a liquid crystal compound having two characteristic structures was useful, and thus completed the present invention.

The present invention provides a liquid crystal display element including a first transparent insulating substrate and a second transparent insulating substrate, which are disposed so as to face each other; a liquid crystal layer containing a liquid crystal composition, which is interposed between the first substrate and the second substrate; for each pixel on the first substrate, a common electrode containing a transparent conductive material and a plurality of gate bus lines and data bus lines disposed in a matrix shape: a thin film transistor provided at an intersection between the gate bus lines and data bus lines, and a pixel electrode containing a transparent conductive material, which is driven by the transistor; and Alignment layer which induce homogeneous alignment between the liquid crystal layer and each of the first and second substrates, in which an inter-electrode distance R (μm) between the pixel electrode and the common electrode and an application voltage E(V) satisfy the following two relationships.

$$E/R \geq 3 (V/\mu m)$$

$$E \leq 15 (V)$$

The liquid crystal composition has negative dielectric anisotropy, a transition temperature of the nematic phase-isotropic liquid of 60° C. or more, a dielectric anisotropy absolute value of 1.5 or more, and the liquid crystal display element contains at least one compound selected from the group of compounds represented by General Formula (I):

[Chem. 1]

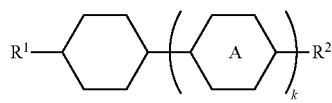
(I)

(in the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, A represents a 1,4-phenylene group or a trans-1,4-cyclohexylene group, k represents 1 or 2, provided that in a case where k is 2, two A's may be the same or different); and at least one compound selected from the group of compounds represented by General Formula (II):

[Chem. 2]

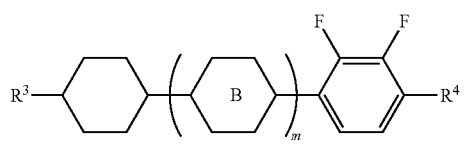
(II)

(in the formula, $R^3$ is an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, and B represents a 1,4-phenylene group or a trans-1,4-cyclohexylene group, and m represents 0, 1 or 2, provided that, in a case where m is 2, two B's may be the same or different.)

Advantageous Effects of Invention

The liquid crystal display element of the present invention is excellent in high-speed responsiveness, has a feature that few display defects such as flickering are generated, and has excellent display characteristics. The liquid crystal display element of the present invention is useful for display elements such as liquid crystal TVs or monitors.

DESCRIPTION OF EMBODIMENTS

As described above, the present invention is the finding of an n-type liquid crystal composition optimal for a liquid crystal display element having a large potential difference gradient due to the distance between electrodes in the FFS mode or the like.

(Liquid Crystal Display Element)

The display element of the present invention relates to a display element having a large potential difference gradient due to the distance between electrodes in the FFS mode or the like. Below, referring to FIGS. 1 to 6, an example of a typical liquid crystal display element of FFS mode as a display element having a large potential difference gradient due to the inter-electrode distance will be described.

Figure 1:
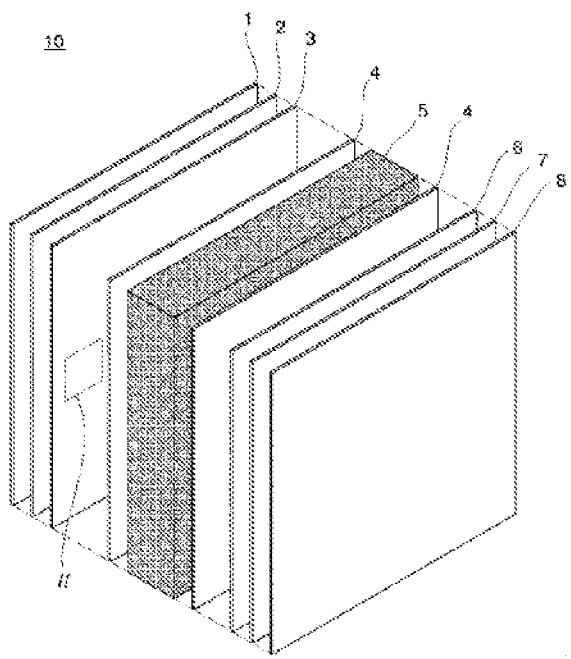
FIG. 1 is a diagram schematically showing an example of a configuration of a liquid crystal display element of the present invention.
Figure 3:
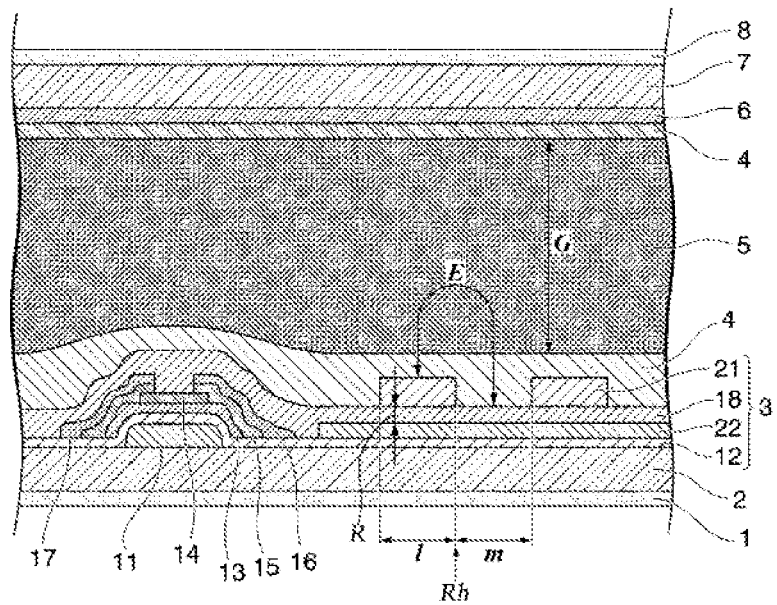
FIG. 3 is a cross-sectional view of the liquid crystal display element shown in FIG. 1 in the direction along the line III-III in FIG. 2.

FIG. 1 is a diagram schematically showing a configuration of a liquid crystal display element. In FIG. 1, each of the constituent elements is illustrated separately for the sake of convenience. As shown in FIG. 1, the configuration of the liquid crystal display element 10 according to the present invention is an FFS mode liquid crystal display element which has a liquid crystal composition (or a liquid crystal layer 5) interposed between a first transparent insulating substrate 2 and a second transparent insulating substrate 8 disposed to oppose each other, in which the liquid crystal composition of the present invention is used as the liquid crystal composition. In the first transparent insulating substrate 2, an electrode layer 3 is formed on the surface of the liquid crystal layer 5 side. In addition, the liquid crystal display element 10 also has a liquid crystal layer 5 and a pair of alignment films 4 for inducing homogeneous alignment by directly coming into contact with the liquid crystal composition forming the liquid crystal layer 5 between the first transparent insulating substrate 2 and the second transparent insulating substrate 7, and the liquid crystal molecules in the liquid crystal composition are aligned to be substantially parallel with respect to the substrates 2 and 7 when no voltage is applied. As shown in FIG. 1 and FIG. 3, the second substrate 2 and the first substrate 8 may be interposed between a pair of polarizing plates 1 and 8. Furthermore, in FIG. 1, a color filter 6 is provided between the second substrate 7 and the alignment film 4.

That is, the liquid crystal display element 10 according to the present invention is formed by sequentially laminating a first polarizing plate 1, a first substrate 2, an electrode layer 3 including a thin film transistor, an alignment film 4, the liquid crystal layer 5 including a liquid crystal composition, the alignment film 4, the color filter 6, the second substrate 7, and the second polarizing plate 8. As the first substrate 2 and the second substrate 7, it is possible to use a transparent material having flexibility such as glass or plastic, and one may be an opaque material such as silicon. The two substrates 2 and 7 are bonded together by a sealing material and a sealant such as an epoxy type thermosetting composition or the like disposed in the peripheral region and, in order to maintain the distance between the substrates, for example, a granular spacer such as glass particles, plastic particles, alumina particles or the like or a spacer column made of a resin formed by a photolithography method may be disposed therebetween.

Figure 2:
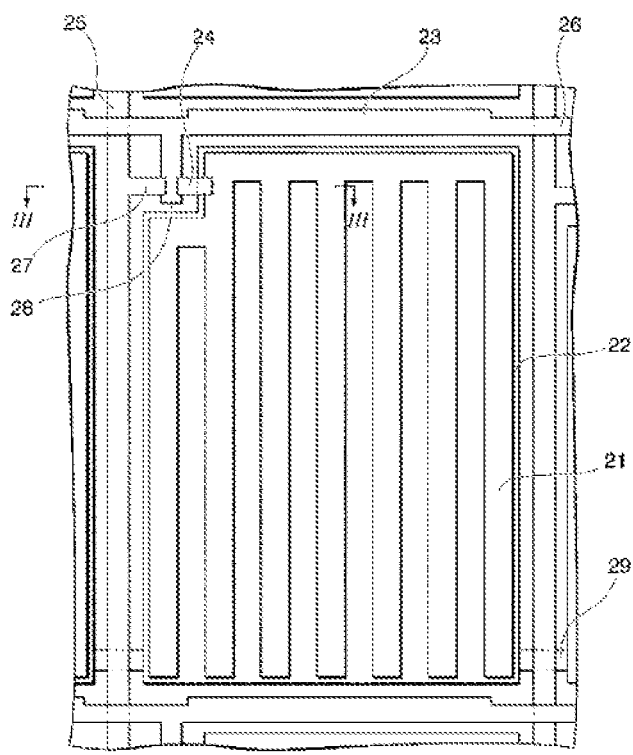
FIG. 2 is a planar diagram in which a region surrounded by a line II of an electrode layer 3 formed on a substrate 2 in FIG. 1 is enlarged.

FIG. 2 is an enlarged plan view of a region surrounded by the II line of the electrode layer 3 formed on the substrate 2 in FIG. 1. FIG. 3 is a cross-sectional view of the liquid crystal display element shown in FIG. 1 taken along the line III-III in FIG. 2. As shown in FIG. 2, the electrode layer 3 including the thin film transistor formed on the surface of the first substrate 2 includes a plurality of gate bus lines 26 for supplying scanning signals and a plurality of data bus line 25 for supplying display signals, which are disposed in a matrix shape to cross each other. Note that, in FIG. 2, only a pair of gate bus lines 25 and a pair of data bus lines 24 are shown.

A region surrounded by the plurality of gate bus lines 26 and the plurality of data bus lines 25 forms a unit pixel of the liquid crystal display device, and the pixel electrode 21 and the common electrode 22 are formed in the unit pixel. Thin film transistors including a source electrode 27, a drain electrode 24, and a gate electrode 28 are provided in the vicinity of the intersections where the gate bus lines 26 and the data bus lines 25 intersect each other. This thin film transistor is connected to the pixel electrode 21 as a switch element for supplying a display signal to the pixel electrode 21. In addition, a common line 29 is provided in parallel with the gate bus line 26. This common line 29 is connected to the common electrode 22 in order to supply a common signal to the common electrode 22.

As shown in FIG. 3, a preferable aspect of the structure of the thin film transistor has, for example, a gate electrode 11 formed on the surface of the substrate 2, a gate insulating layer 12 provided so as to cover the gate electrode 11 and to cover substantially the entire surface of the substrate 2, a semiconductor layer 13 formed on the surface of the gate insulating layer 12 so as to oppose the gate electrode 11, a protective film 14 provided so as to cover a part of the surface of the semiconductor layer 17, a drain electrode 16 provided so as to cover one side end section of the protective layer 14 and the semiconductor layer 13 and to come into contact with the gate insulating layer 12 formed on the substrate 2 surface, a source electrode 17 provided so as to cover the other side end portion of the protective film 14 and the semiconductor layer 13 and to come into contact with the gate insulating layer 12 formed on the substrate 2 surface, and an insulating protective layer 18 provided so as to cover the drain electrode 16 and the source electrode 17. An anodic oxide coating (not shown) may be formed on the surface of the gate electrode 11 for a reason such as eliminating a step difference with the gate electrode.

For the semiconductor layer 13, it is possible to use amorphous silicon, polycrystalline polysilicon or the like and when a transparent semiconductor film such as ZnO, IGZO (In—Ga—Zn—O), ITO or the like is used, it is possible to suppress adverse effects on the light carrier caused by light absorption, which is preferable from the viewpoint of increasing the opening ratio of the element.

Furthermore, for the purpose of reducing the width and the height of the Schottky barrier, an ohmic contact layer 15 may be provided between the semiconductor layer 13 and the drain electrode 16 or the source electrode 17. For the ohmic contact layer, it is possible to use a material obtained by adding an impurity such as phosphorus such as n-type amorphous silicon or n-type polycrystalline silicon at a high concentration.

The gate bus lines 26, the data bus lines 25 and the common lines 29 are preferably metal films, more preferably Al, Cu, Au, Ag, Cr, Ta, Ti, Mo, W, Ni or an alloy thereof, and a wiring of Al or an alloy thereof is particularly preferably used. In addition, the insulating protective layer 18 is a layer having an insulating function, and is formed of silicon nitride, silicon dioxide, a silicon oxynitride film, or the like.

In the embodiment shown in FIGS. 2 and 3, the common electrode 22 is a flat, plate-shaped electrode formed on substantially the entire surface of the gate insulating layer 12, while the pixel electrode 21 is a comb shaped electrode formed on the insulating protective layer 18 covering the common electrode 22. That is, the common electrode 22 is disposed at a position closer to the first substrate 2 than the pixel electrode 21, and these electrodes are disposed to overlap with the insulating protective layer 18 interposed therebetween. The pixel electrode 21 and the common electrode 22 are formed of a transparent conductive material such as Indium Tin Oxide (ITO), Indium Zinc Oxide (IZO), Indium Zinc Tin Oxide (IZTO), or the like. Since the pixel electrode 21 and the common electrode 22 are formed of a transparent conductive material, the area to be opened in the unit pixel area is increased, and the opening ratio and the transmittance are increased.

In the FFS mode display element, in order to form a fringe electric field between the electrodes, the pixel electrode 21 and the common electrode 22 are formed such that the horizontal inter-electrode distance Rh in the substrate direction between the pixel electrode 21 and the common electrode 22 is smaller than the distance G between the first substrate 2 and the second substrate 7. Note that, the inter-electrode distance Rh represents the horizontal direction distance between each of the electrodes on the substrate. FIG. 3 shows an example in which, since the flat, plate-shaped common electrode 22 and the comb-shaped pixel electrode 21 are overlapped with each other, the inter-electrode distance Rh=0, and the inter-electrode distance Rh is smaller than the distance (that is, the cell gap) G between the first substrate 2 and the second substrate 7 and the electric field E of the fringe is formed. Accordingly, in the FFS type liquid crystal display element, it is possible to use a horizontal electric field formed in a direction perpendicular with respect to a line forming the comb shape of the pixel electrode 21 and a parabolic electric field. The electrode width l of the comb-shaped portion of the pixel electrode 21 and the width m of the gap of the comb-shaped portion of the pixel electrode 21 are preferably formed at a width such that all the liquid crystal molecules in the liquid crystal layer 5 are able to be driven by the generated electric field.

In the liquid crystal display element of the present invention, the inter-electrode distance R (μm) between the pixel electrode and the common electrode and the application voltage E (V) satisfy the following two relationships.

$$E/R \geq 3 \ (V/\mu m)$$

$$E \leq 15 \ (V)$$

The application voltage E(V) applied to the pixel electrode is determined by the material of the semiconductor, the dielectric constant of the liquid crystal material to be driven, and the like; however, in general, the application voltage E(V) is 20 V or less, and is preferably 15 V or less, preferably 12 V or less, more preferably 10 V or less, particularly preferably 8 V or less from the relationship with power consumption, and the lower the lowest driving voltage value the better from the viewpoint of power consumption; however, from the above point of view, at least about 1.2 V is necessary, 3.3 V or more is typical, and 5 V or more is more typical.

In the present invention, the inter-electrode distance R (μm) is characterized by being smaller than that of the VA mode or the like, but the definition of the distance means the minimum distance between the pixel electrode and the common electrode and is different from the horizontal inter-electrode distance Rh with respect to the substrate. That is, in the FFS mode, the horizontal inter-electrode distance Rh may be 0, but R has a finite value because there is an insulating layer between the pixel electrode and the common electrode.

Even in the case where both the pixel electrode and the common electrode are comb-shaped electrodes, the inter-electrode distance is a finite value, but also in this case, the inter-electrode distance is smaller than the cell gap G. The distance between the electrodes is preferably 3 μm or less, more preferably 2 μm or less, more preferably 1 μm or less, and particularly preferably 0.5 μm or less.

The cell gap of the liquid crystal display element is generally 5 to 1 μm, preferably 4 to 2 μm, more preferably 4 to 2.5 μm, and particularly preferably 4 to 3 μm.

From the above, in the liquid crystal display element of the present invention, the value of E/R is characterized as 3 or more, but is preferably 5 or more, more preferably 10 or more, more preferably 15 or more, and particularly preferably 20 or more.

As described above, since the liquid crystal display element of the present invention has a large potential difference gradient due to the inter-electrode distance, the liquid crystal display element exhibits display characteristics different from those of elements having a small potential difference gradient. For example, it is known that, in cases where a phenomenon called flicker, in which the display flickers slightly due to the brightness of the display element changing periodically, can be visually perceived and especially in cases where the phenomenon is not noticeable, eye fatigue, weariness, and the like are induced when viewed for long periods and these adversely affect health.

The present inventors found that, in a display element having a large potential difference gradient due to the distance between electrodes as in the present invention, since a portion having a large potential difference gradient and a portion having a small potential difference gradient are easily formed in the display element, the influence of flicker is particularly likely to occur. Then, the present invention has been completed by considering a combination of a display element in which flicker is not easily caused and a specific liquid crystal material having negative dielectric anisotropy.

From the viewpoint of preventing the leakage of light, it is preferable that the color filter 6 form a black matrix (not shown) in a portion corresponding to the thin film transistor and the storage capacitor 23.

Figure 4:
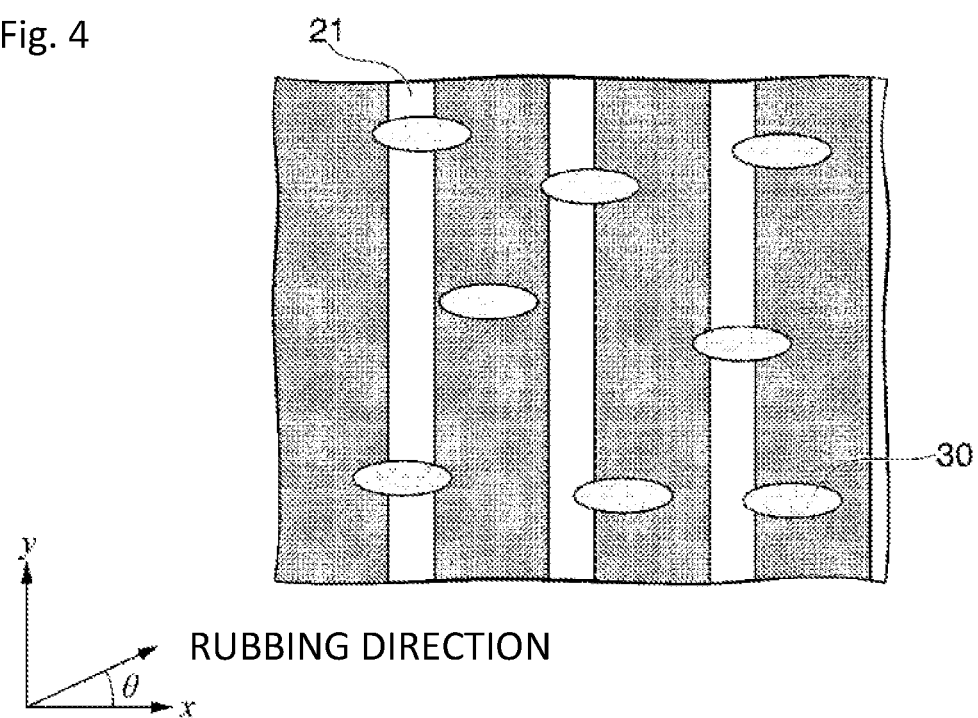
FIG. 4 is a view schematically showing an alignment direction of the liquid crystal induced by an alignment film 4.

On the electrode layer 3 and the color filter 6, a pair of alignment films 4 directly coming into contact with the liquid crystal composition forming the liquid crystal layer 5 to induce homogeneous alignment are provided. The alignment film 4 is, for example, a polyimide film subjected to a rubbing treatment, and the alignment directions of each alignment film are in parallel. Note that, the rubbing direction (alignment direction of the liquid crystal composition) of the alignment film 4 in the present embodiment will be described using FIG. 4. FIG. 4 is a diagram schematically showing the alignment direction of the liquid crystal induced by the alignment film 4. In the present invention, a liquid crystal composition having negative dielectric anisotropy is used. Accordingly, when the direction perpendicular to the line forming the comb shape of the pixel electrode 21 (the direction in which the horizontal electric field is formed) is the x axis, the angle θ formed by the x axis and the major axis direction of the liquid crystal molecule 30 is preferably oriented to be approximately 0 to 45°. In the example shown in FIG. 3, an example is shown in which the angle θ between the x axis and the major axis direction of the liquid crystal molecule 30 is approximately 0°. The reason why the alignment direction of the liquid crystal is induced is to increase the maximum transmittance of the liquid crystal display device.

In addition, the polarizing plate 1 and the polarizing plate 8 are able to be adjusted such that the viewing angle and contrast are favorable by adjusting the polarizing axes of the respective polarizing plates, and it is preferable to have transmission axes orthogonal to each other such that these transmission axes are operated in a normally black mode. In particular, it is preferable that any one of the polarizing plate 1 and the polarizing plate 8 is disposed so as to have a transmission axis parallel to the alignment direction of the liquid crystal molecules 30. In addition, it is preferable to adjust the product of the refractive index anisotropy Δn of the liquid crystal and the cell thickness d so that the contrast is maximized. Furthermore, it is also possible to use a retardation film for widening the viewing angle.

In the FFS type liquid crystal display element 10 formed as described above, by supplying an image signal (voltage) to the pixel electrode 21 via the thin film TFT, a fringe electric field is formed between the pixel electrode 21 and the common electrode 22 and the liquid crystal is driven by this electric field. That is, in a state in which no voltage is applied, the liquid crystal molecules 30 are disposed such that the major axis direction thereof is parallel to the alignment direction of the alignment film 4. When a voltage is applied, an equipotential line of a parabolic electric field is formed between the pixel electrode 21 and the common electrode 22 up to the upper portion of the pixel electrode 21 and the common electrode 22, and the liquid crystal molecules 30 in the liquid crystal layer 5 rotate in the liquid crystal layer 5 along the formed electric field. In the present invention, since the liquid crystal molecules 30 having negative dielectric anisotropy are used, the major axis direction of the liquid crystal molecules 30 rotates so as to be orthogonal to the generated electric field direction. The liquid crystal molecules 30 positioned near the pixel electrode 21 are susceptible to the influence of the fringe electric field, but the liquid crystal molecules 30 having the negative dielectric anisotropy have a polarization direction on the minor axis of the molecule, the major axis direction does not rotate in the direction orthogonal with respect to the alignment film 4 and the major axis direction of all of the liquid crystal molecules 30 in the liquid crystal layer 5 is able to be maintained in a parallel direction with respect to the alignment film 4. Accordingly, in comparison with an FFS type liquid crystal display element using the liquid crystal molecules 30 having positive dielectric anisotropy, it is possible to obtain excellent transmittance characteristics.

Figure 5:
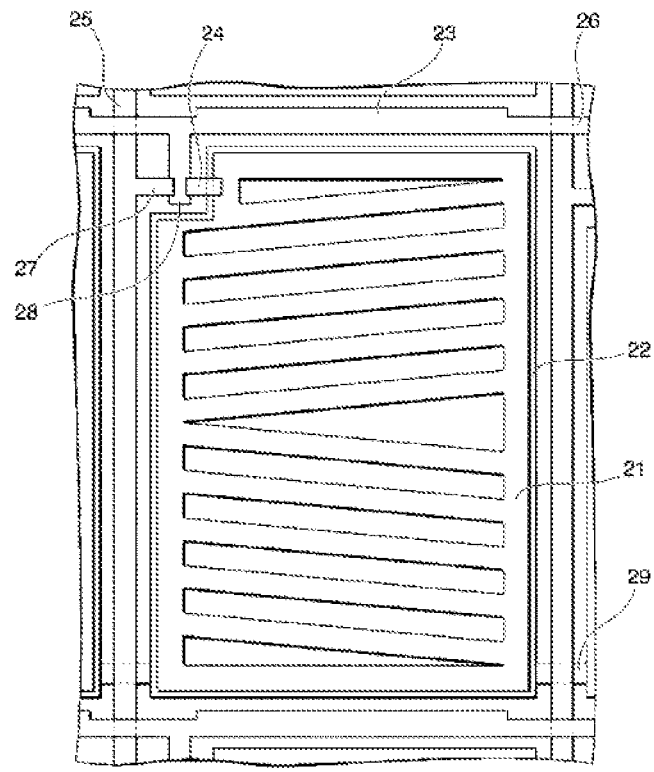
FIG. 5 is a planar diagram in which another example of the region surrounded by the line II of the electrode layer 3 formed on the substrate 2 in FIG. 1 is enlarged.

The FFS type liquid crystal display element described with reference to FIG. 1 to FIG. 4 is merely an example and various other embodiments are possible as long as these embodiments do not depart from the technical idea of the present invention. For example, FIG. 5 is another example of a plan view enlarging a region surrounded by the II line of the electrode layer 3 formed on the substrate 2 in FIG. 1. As shown in FIG. 5, the pixel electrode 21 may be formed to have a slit. In addition, the slit pattern may be formed so as to have an inclination angle with respect to the gate bus lines 26 or the data bus lines 25.

Figure 6:
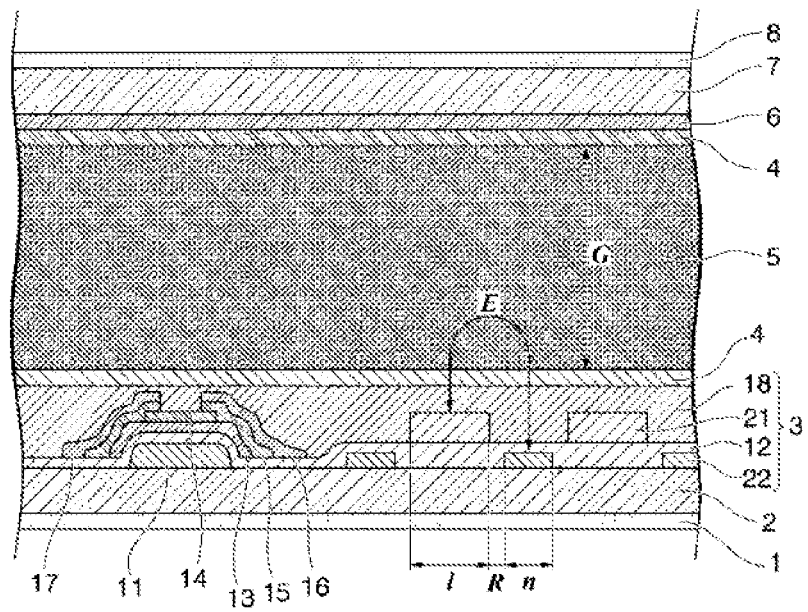
FIG. 6 is a cross-sectional diagram of another example which cuts away the liquid crystal display element shown in FIG. 1 in the direction of line III-III in FIG. 2.

In addition, FIG. 6 is another example of a cross-sectional view of the liquid crystal display element shown in FIG. 1 taken along the line III-III in FIG. 2. In the example shown in FIG. 6, a common electrode 22 having a comb shape or a slit is used, and the inter-electrode distance in the horizontal direction on the substrate of the pixel electrode 21 and the common electrode 22 is R=α. Furthermore, an example is given in FIG. 3 in which the common electrode 22 is formed on the gate insulating film 12; however, as shown in FIG. 6, the common electrode 22 may be formed on the first substrate 2 and the pixel electrode 21 may be provided via the gate insulating film 12. The electrode width l of the pixel electrode 21, the electrode width n of the common electrode 22, and the inter-electrode distance Rh are preferably appropriately adjusted to a width such that all the liquid crystal molecules in the liquid crystal layer 5 can be driven by the generated electric field.

Figure 7:
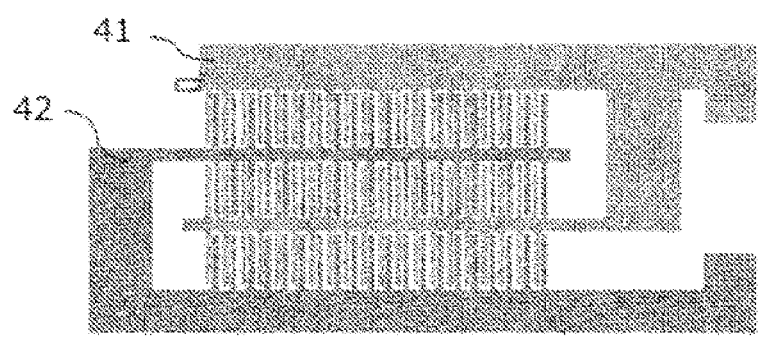
FIG. 7 is a planar diagram in which the electrode configuration of the liquid crystal display element is enlarged.

In addition, as shown in FIG. 7, a pixel electrode 41 and a common electrode 42 may be provided in a state of being meshed while spaced apart on the same surface. Also in the FFS type display element having the structure shown in FIG. 7, the distance R between the electrodes in the horizontal direction on the substrate is formed to be smaller than the distance G between the first substrate 2 and the second substrate 7.

Since the FFS mode liquid crystal display element according to the present invention uses a specific liquid crystal composition, it is possible to achieve both a high-speed response and suppression of display failure at the same time.

In addition, in the FFS mode liquid crystal display element, when injecting the liquid crystal layer 5 between the first substrate 2 and the second substrate 7, for example, a vacuum injection method, a one drop fill (ODF) method, or the like is performed; however, in the present embodiment, in the ODF method, it is possible to suppress the occurrence of drip marks when the liquid crystal composition is dropped onto the substrate. Note that, a drip mark is defined as a phenomenon in which a white trace appears where the liquid crystal composition is dropped when black is displayed.

Although the occurrence of drip marks is greatly affected by the liquid crystal material to be injected, it is not possible to avoid the influence thereof even through the configuration of the display element. In the FFS mode liquid crystal display element, for the thin film transistor formed in the display element, the pixel electrode 21 having a comb shape or a slit, and the like, since there is no member separating the liquid crystal composition except for the thin alignment film 4 or the thin alignment film 4, the thin insulating protective layer 18, and the like, there is a high possibility that it is not possible to completely block the ionic substance, and it is not possible to avoid the generation of drip marks due to the interaction between the metal material forming the electrode and the liquid crystal composition; however, by using a combination of the liquid crystal composition of the present invention in an FFS type liquid crystal display element, the occurrence of drip marks is able to be effectively suppressed.

In addition, in the manufacturing steps of the liquid crystal display element using the ODF method, it is necessary to drop an optimum amount of injected liquid according to the size of the liquid crystal display element; however, for example, with the liquid crystal composition of the present invention, since the influence with respect to sudden pressure changes or impacts in the dripping apparatus generated when dripping the liquid crystal is small and it is possible to continue stably dripping the liquid crystal over a long period, it is also possible to keep the yield of the liquid crystal display element high. In particular, for small liquid crystal display elements frequently used in smartphones which have recently come into wide use, control of the deviations from an optimum value within a certain range is itself difficult due to the optimum amount of injected liquid crystal being small; however, by using the liquid crystal composition of the present invention, it is possible to realize a stable discharging amount of the liquid crystal material even in small liquid crystal display elements.

(Liquid Crystal Layer)

The liquid crystal composition of the present invention contains one type or two or more types of compounds represented by General Formula (I) as a first component.

[Chem. 3]

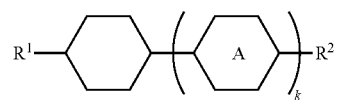

(I)

In the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, A represents a 1,4-phenylene group or a trans-1,4-cyclohexylene group, and k represents 1 or 2 and, in a case where k is 2, the two A's may be the same or may be different.

The total content of the compounds represented by General Formula (I) is preferably 5% by mass as the lower limit value of the content of the whole composition, more preferably 10% by mass, more preferably 15% by mass, still more preferably 20% by mass, and particularly preferably 25% by mass, and as the upper limit value, preferably 65% by mass, more preferably 55% by mass, still more preferably 50% by mass, particularly preferably 47% by mass, and most preferably 45% by mass.

Specific examples of the compound represented by General Formula (I) include the compounds represented by the group of compounds represented by the following General Formula (I-a) to General Formula (I-e).

[Chem. 4]

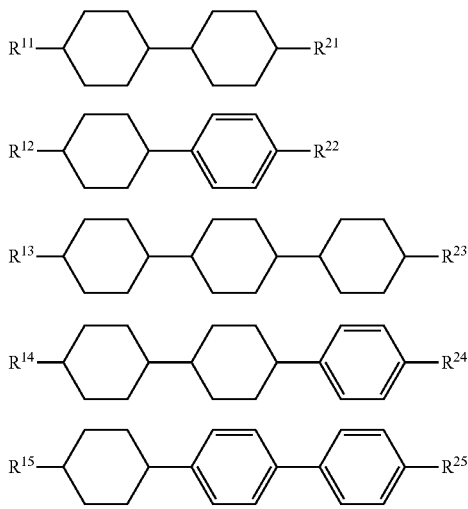

In the formulas, $R^{11}$ to $R^{15}$ and $R^{21}$ to $R^{25}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

The compound selected from the group of compounds represented by General Formula (I-a) to General Formula (I-e) preferably contains 1 to 10 types, more preferably 1 to 8 types, particularly preferably 1 to 5 types, and it is also preferable to contain two or more types of compounds.

It is preferable that $R^{11}$ to $R^{15}$ and $R^{21}$ to $R^{25}$ each independently represent an alkyl group having 1 to 8 carbon atoms, an alkenyl group having 2 to 8 carbon atoms, or an alkoxy group having 2 to 8 carbon atoms, more preferably an alkyl group having 1 to 5 carbon atoms, an alkenyl group having 2 to 5 carbon atoms, or an alkoxy group having 2 to 5 carbon atoms, and in the case of representing an alkenyl group, the structure represented by the formulas (i) to (iv) described below is preferable.

[Chem. 5]

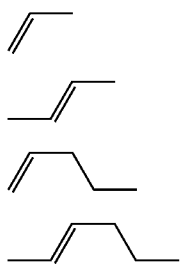

In the formulas, the ring structure is bonded at the right end.

$R^{11}$ and $R^{21}$, $R^{12}$ and $R^{22}$, $R^{13}$ and $R^{23}$, $R^{14}$ and $R^{24}$, $R^{15}$ and $R^{25}$ may be the same or different, but preferably represent different substituents. In the characteristics of the liquid crystal element, in a case of being used for an application in which emphasis is placed on response speed, it is preferable that one of the above is an alkenyl group. On the other hand, in a case where particular emphasis is placed on reliability in the liquid crystal display element, it is preferable that both are alkyl groups. Even in a case where both are alkyl groups, it is preferable that the number of carbon atoms is different.

From these points, as the compound represented by General Formula (I) where one group is an alkenyl group, it is preferable to contain at least one kind of compound selected from the group of compounds represented by the following General Formula (III).

[Chem. 6]

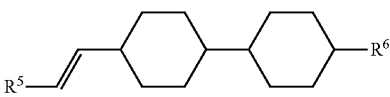

In the formula, $R^5$ represents a hydrogen atom or a methyl group, $R^6$ is an alkyl group having 1 to 5 carbon atoms, an alkenyl group having 2 to 5 carbon atoms, or an alkoxy group having 1 to 4 carbon atoms.

More specifically, the compound represented by General Formula (III) is preferably a compound described below.

[Chem. 7]

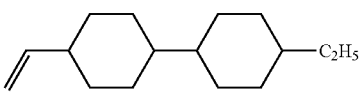
(III-a1)

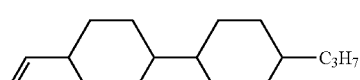
(III-a2)

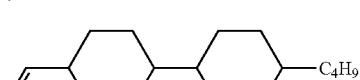
(III-a3)

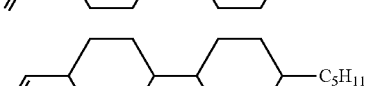
(III-a4)

[Chem. 8]

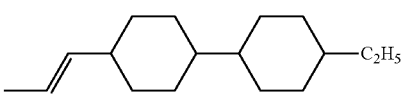
(III-b1)

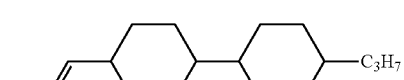
(III-b2)

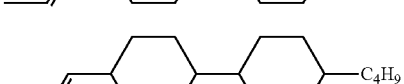
(III-b3)

(III-b4)

In the case of containing the compound represented by General Formula (III), the lower limit value of the content of the compound represented by General Formula (III) in the liquid crystal composition is preferably 5% by mass, more preferably 15% by mass, more preferably 20% by mass, particularly preferably 23% by mass, and most preferably 25% by mass, and the upper limit is preferably 70% by mass, more preferably 60% by mass, still more preferably 55% by mass, particularly preferably 52% by mass, and most preferably 50% by mass. More specifically, in a case where emphasis is placed on the response speed, the lower limit value is preferably 20% by mass, more preferably 30% by mass, more preferably 35% by mass, particularly preferably 38% by mass, and most preferably 35% by mass and the upper limit value is preferably 70% by mass, more preferably 60% by mass, still more preferably 55% by mass, particularly preferably 52% by mass, and most preferably 50% by mass. In a case where more emphasis is placed on the driving voltage, the lower limit value is preferably 5% by mass, more preferably 15% by mass, still more preferably 20% by mass, particularly preferably 23% by mass, and most preferably 25% by mass, and the upper limit value is preferably 60% by mass, more preferably 50% by mass, still more preferably 45% by mass, particularly preferably 42% by mass, and most preferably 40% by mass. The ratio of the compound represented by General Formula (III) is such that the lower limit of the content of the compound represented by General Formula (III) in the total content of the compound represented by General Formula (I) in the liquid crystal composition is preferably 60% by mass, more preferably 70% by mass, still more preferably 75% by mass, particularly preferably 78% by mass, and most preferably 80% by mass, and the upper limit value is preferably 90% by mass, more preferably 95% by mass, more preferably 97% by mass, still more preferably 99% by mass, and particularly preferably 100% by mass.

As the compound represented by General Formula (I-a) to General Formula (I-e) other than the compound represented by General Formula (III), more specifically, the following compounds is preferable.

[Chem. 9]

$C_3H_7$—⬡—⬡—$C_2H_5$ (I-a1)

$C_3H_7$—⬡—⬡—$C_4H_9$ (I-a2)

$C_3H_7$—⬡—⬡—$C_5H_{11}$ (I-a3)

[Chem. 10]

$C_2H_5$—⬡—⬡—O\ (I-a4)

$C_3H_7$—⬡—⬡—O\ (I-a5)

$C_4H_9$—⬡—⬡—O\ (Ia-6)

-continued $C_5H_{11}$—⬡—⬡—O\ (I-a7)

$C_2H_5$—⬡—⬡—O\_ (I-a8)

$C_3H_7$—⬡—⬡—O\_ (I-a9)

$C_4H_9$—⬡—⬡—O\_ (I-a10)

$C_5H_{11}$—⬡—⬡—O\_ (I-a11)

[Chem. 11]

\\=—⬡—⬡—$C_3H_7$ (I-a12)

\\=—⬡—⬡—$C_3H_7$ (I-a13)

\\=—⬡—⬡—$C_2H_5$ (I-a14)

\\=—⬡—⬡—$C_2H_5$ (I-a15)

[Chem. 12]

$C_2H_5$—⬡—⌬—O\ (I-b1)

$C_3H_7$—⬡—⌬—O\ (I-b2)

$C_4H_9$—⬡—⌬—O\ (I-b3)

$C_5H_{11}$—⬡—⌬—O\ (I-b4)

$C_2H_5$—⬡—⌬—O\_ (I-b5)

$C_3H_7$—⬡—⌬—O\_ (I-b6)

-continued

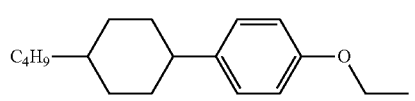
(I-b7)

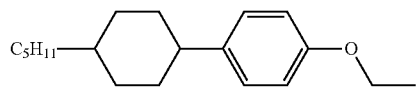
(I-b8)

[Chem. 13]

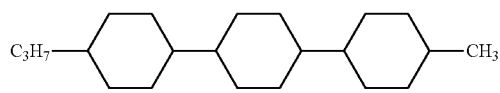
(I-c1)

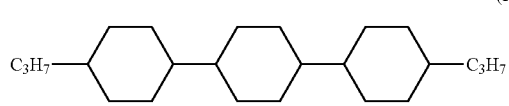
(I-c2)

[Chem. 14]

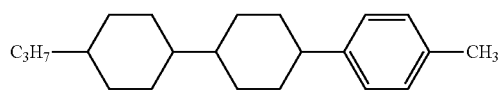
(I-d1)

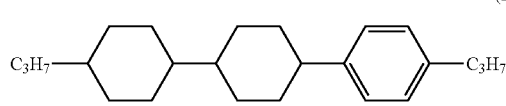
(I-d2)

(I-d3)

[Chem. 15]

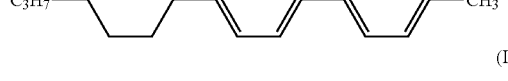
(I-e1)

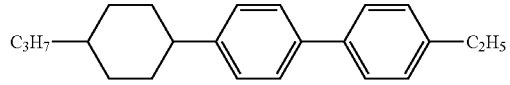
(I-e2)

Among the above, the compounds represented by formula (III-a2), formula (III-b2), formula (I-a1) to formula (I-a6), formula (I-b2), formula (I-b6), formula (I-d1), formula (I-d2), formula (I-d), and formula (I-e2) are preferable.

The liquid crystal composition of the present invention contains one type or two or more types of compounds represented by General Formula (II) as a second component.

[Chem. 16]

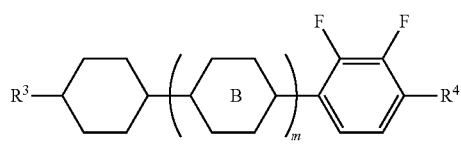
(II)

In the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, B represents a 1,4-phenylene group or a trans-1,4-cyclohexylene group, and m represents 0, 1 or 2, but in a case where m is 2, the two B's may be the same or may be different.

The lower limit value of the content of the compound represented by the compound represented by General Formula (II) in the liquid crystal composition is preferably 10% by mass, more preferably 20% by mass, still more preferably 25% by mass, particularly preferably 28% by mass, and most preferably 30% by mass, and the upper limit value is preferably 85% by mass, more preferably 75% by mass, still more preferably 70% by mass, particularly preferably 67% by mass, and most preferably 65% by mass.

For the compound represented by General Formula (II), it is preferable to select least one or more types from the group of compounds represented by General Formula (IIa) to General Formula (IIc), and more preferable to select two or more types.

[Chem. 17]

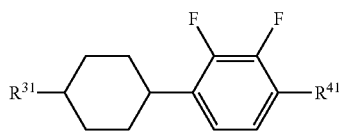
(IIa)

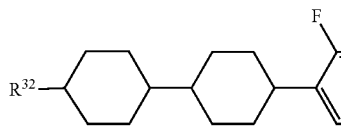
(IIa)

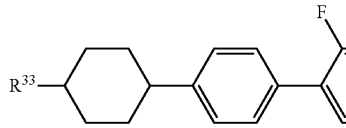
(IIa)

In the formulas, $R^{31}$ to $R^{33}$ and $R^{41}$ to $R^{43}$ represent the same meanings as $R^3$ and $R^4$ in General Formula (II).

Specific examples of the compound represented by General Formula (IIa) preferably include compounds represented by the following formulas (IIa-1) to (IIa-8)

[Chem. 18]

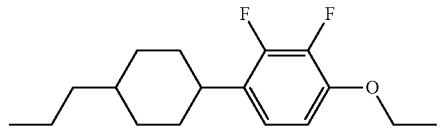 [SMILES: CCCC1CCC(c2ccc(OCC)c(F)c2F)CC1]
(IIa-1)

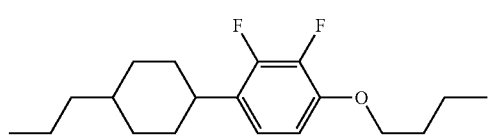
(IIa-2)

-continued

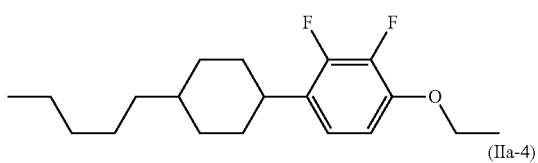
(IIa-3)

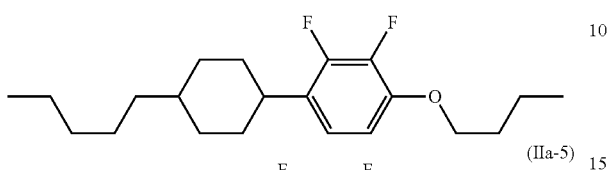
(IIa-4)

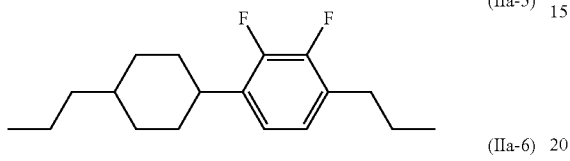
(IIa-5)

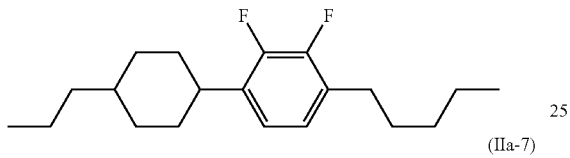
(IIa-6)

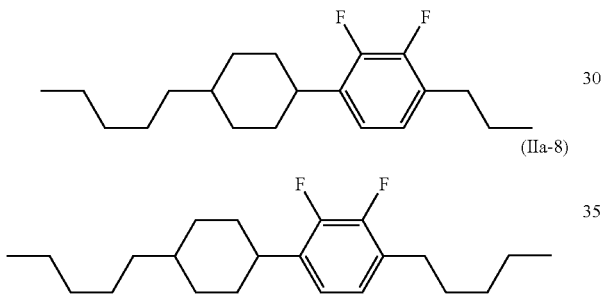
(IIa-7)

(IIa-8)

However, compounds represented by formula (IIa-1) to formula (IIa-4) are more preferable, and compounds represented by formula (IIa-1) and formula (IIa-3) are even more preferable.

The lower limit value of the compound represented by General Formula (IIa) is preferably 2% by mass, and more preferably 3% by mass, and the upper limit value is preferably 45% by mass, more preferably 35% by mass, still more preferably 30% by mass, particularly preferably 27% by mass, and most preferably 25% by mass.

In a case where four or more types of compounds represented by General Formula (IIa) are used, it is preferable to use a combination of the compounds represented by formula (IIa-1) to formula (IIa-4), and the content of the compound represented by formula (IIa-1) to formula (IIa-4) is preferably 50% by mass or more in the compound represented by General Formula (IIa1), more preferably 70% by mass or more, and more preferably 80% by mass or more.

In a case where three types of compounds represented by General Formula (IIa) are used, it is preferable to use a combination of the compounds represented by formula (IIa-1), formula (IIa-2), and formula (IIa-3), and the content of the compound represented by formula (IIa-1), formula (IIa-2), and formula (IIa-3) is preferably 50% by mass or more in the compound represented by General Formula (IIa), more preferably 70% by mass or more, more preferably 80% by mass or more, particularly preferably 85% by mass or more, and most preferably 90% by mass or more.

In a case where two compounds represented by General Formula (IIa) are used, it is preferable to use a combination of the compounds represented by formula (IIa-1) and formula (IIa-3), and the content of the compound represented by formula (IIa-1) and formula (IIa-3) is preferably 50% by mass or more in the compound represented by General Formula (IIa), more preferably 70% by mass or more, more preferably 80% by mass or more, particularly preferably 85% by mass or more, and most preferably 90% by mass or more.

Specific examples of the compound represented by General Formula (IIb) preferably include compounds represented by the following formulas (IIb-1) to (IIb-8).

[Chem. 19]

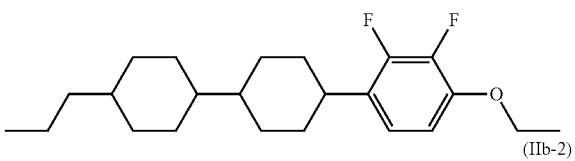
(IIb-1)

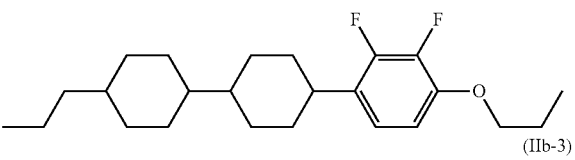
(IIb-2)

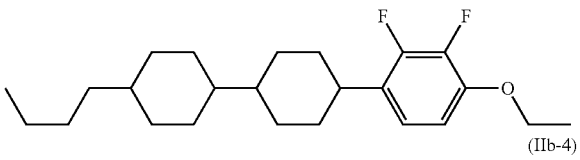
(IIb-3)

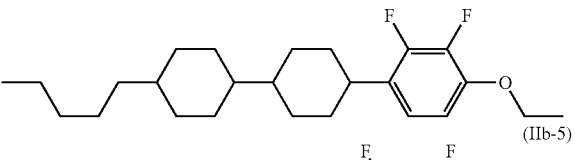
(IIb-4)

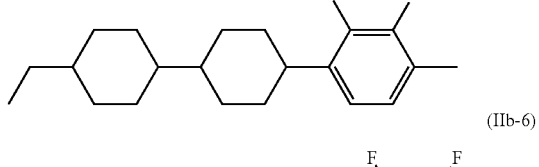
(IIb-5)

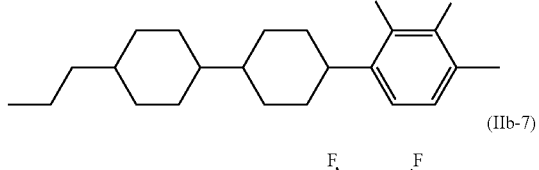
(IIb-6)

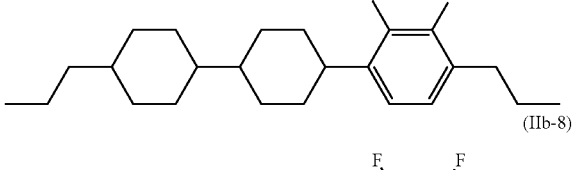
(IIb-7)

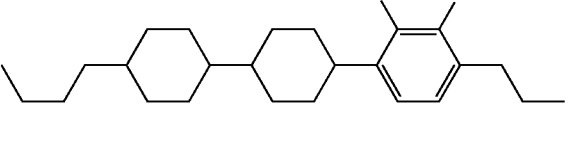
(IIb-8)

However, the compounds represented by formula (IIb-1) to formula (IIb-4) are more preferable, the compounds represented by the formulas (IIb-1) to formula (IIb-3) are even more preferable, and the compounds represented by the formulas (IIb-1) and formula (IIb-3) are particularly preferable.

In a case where four or more types of the compounds represented by General Formula (IIb) are used, it is preferable to use a combination of the compounds represented by formula (IIb-1) to formula (IIb-4), and the content of the compound represented by formula (IIb-1) to formula (IIb-4) is preferably 50% by mass or more in the compound represented by (IIb), more preferably 70% by mass or more, more preferably 80% by mass or more, particularly preferably 85% by mass or more, and most preferably 90% by mass or more.

In a case where three types of the compounds represented by General Formula (IIb) are used, it is preferable to use a combination of the compounds represented by formula (IIb-1) to formula (IIb-3), and the content of the compound represented by formula (IIb-1) to formula (IIb-3) is preferably 50% by mass or more in the compound represented by General Formula (IIb), more preferably 70% by mass or more, more preferably 80% by mass or more, particularly preferably 85% by mass or more, and most preferably 90% by mass or more.

In a case where two types of the compounds represented by General Formula (IIb) are used, it is preferable to use a combination of the compounds represented by formula (IIb-1) and formula (IIb-3), and the content of the compound represented by formula (IIb-1) and formula (IIb-3) is preferably 50% by mass or more in the compound represented by General Formula (IIa2), more preferably 70% by mass or more, more preferably 80% by mass or more, particularly preferably 85% by mass or more, and most preferably 90% by mass or more.

Specific examples of the compound represented by General Formula (IIc) preferably include the compounds represented by the following formulas (IIc-1) to (IIc-4).

[Chem. 20]

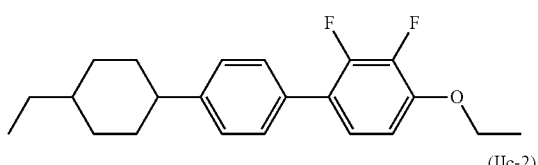
(IIc-1)

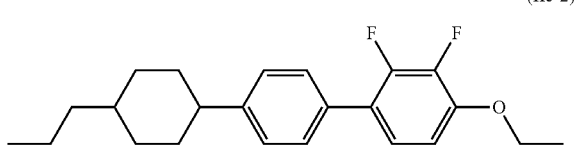
(IIc-2)

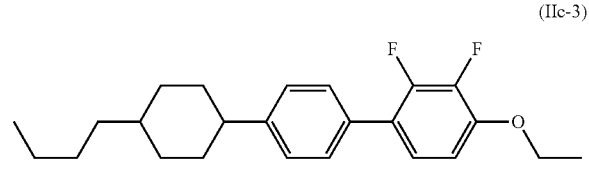
(IIc-3)

-continued

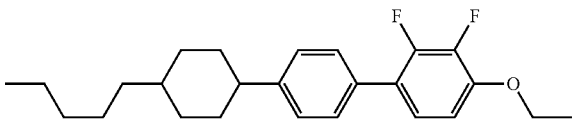
(IIc-4)

However, the compounds represented by formula (IIc-1) or (IIc-2) are preferable.

In a case where two or more types of the compounds represented by General Formula (IIc) are used, it is preferable to use a combination of the compounds represented by formula (IIc-1) and formula (IIc-2), and the content of the compound represented by formula (IIc-1) and formula (IIc-2) is preferably 50% by mass or more in the compound represented by General Formula (IIc), more preferably 70% by mass or more, more preferably 80% by mass or more, particularly preferably 85% by mass or more, and most preferably 90% by mass or more.

The composition of the present invention preferably further contains a compound represented by General Formula (IV). However, the compound represented by General Formula (IV) is excluded from the compound represented by General Formula (II).

[Chem. 21]

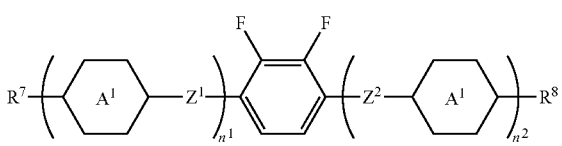
(IV)

In the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and one or more hydrogen atoms in the alkyl group, alkenyl group, alkoxy group, or alkenyloxy group may be substituted with a fluorine atom, and the methylene group in the alkyl group, the alkenyl group, the alkoxy group, or the alkenyloxy group may be substituted with an oxygen atom as long as the oxygen atom is not bonded consecutively, and substituted with a carbonyl group as long as the carbonyl group is not bonded consecutively, $A^1$ and $A^2$ each independently represent a 1,4-cyclohexylene group, a 1,4-phenylene group, or a tetrahydropyran-2,5-diyl group, but in a case where $A^1$ or/and $A^2$ represents a 1,4-phenylene group, one or more hydrogen atoms in the 1,4-phenylene group may be substituted with a fluorine atom, $Z^1$ and $Z^2$ each independently represent a single bond, —OCH$_2$—, —OCF$_2$—, —CH$_2$O—, or CF$_2$O—, $n^1$ and $n^2$ each independently represent 0, 1, 2 or 3, but in a case where $n^1+n^2$ is 1 to 3, and a plurality of $A^1$, $A^2$, $Z^1$ and/or $Z^2$ are present, the above may be the same or different, but compounds where $n^1$ is 1 or 2, $n^2$ is 0, at least one of $A^1$ is a 1,4-cyclohexylene group, and all $Z^1$ are a single bond are excluded.

The lower limit value of the content of the compound represented by General Formula (IV) in the liquid crystal composition is preferably 2% by mass, more preferably 3% by mass, still more preferably 4% by mass, and particularly preferably 5% by mass, and the upper limit value is preferably 45% by mass, more preferably 35% by mass, more preferably 30% by mass, particularly preferably 27% by mass, and most preferably 25% by mass.

In General Formula (IV), $R^7$ and $R^8$ are preferably an alkyl group or an alkenyl group when the bonding ring structure is cyclohexane or tetrahydropyran, and when the bonding ring structure is benzene, $R^7$ and $R^8$ are preferably an alkyl group, an alkoxy group, or an alkenyl group. When the bonding ring structure is cyclohexane or tetrahydropyran, $R^7$ and $R^8$ preferably represent an alkyl group having 1 to 8 carbon atoms, or an alkenyl group having 2 to 8 carbon atoms, more preferably an alkyl group having 1 to 8 carbon atoms, more preferably an alkyl group having 3 to 5 carbon atoms, still more preferably an alkyl group having 3 or 5 carbon atoms, and $R^7$ and $R^8$ are preferably linear. In addition, in General Formula (IV), when the bonding ring structure is benzene, $R^7$ and $R^8$ preferably represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, more preferably represent an alkyl group having 1 to 8 carbon atoms, or an alkoxy group having 1 to 8 carbon atoms, more preferably an alkyl group having 3 to 5 carbon atoms, or an alkoxy group having 2 to 4 carbon atoms, more preferably an alkyl group having 3 or 5 carbon atoms, or an alkoxy group having 2 or 4 carbon atoms, still more preferably an alkoxy group having 2 or 4 carbon atoms, and $R^7$ and $R^8$ are preferably linear.

In a case where emphasis is placed on improving the response speed of the display element, an alkenyl group is preferable, and in a case where emphasis is placed on reliability such as a voltage holding ratio, an alkyl group is preferable. As the alkenyl group, a structure represented by the following formula (i) to (formula iv) is preferable.

[Chem. 22]

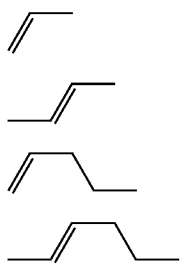

(i)
(ii)
(iii)
(iv)

In the formulas, the ring structure is bonded at the right end.

$A^1$ and $A^2$ are each independently preferably a 1,4-cyclohexylene group, a 1,4-phenylene group, or a tetrahydropyran-2,5-diyl group.

In a case where emphasis is placed on viscosity reduction, $Z^1$ and $Z^2$ are each independently preferably a single bond, and in a case where emphasis is placed on increasing the absolute value of Δε, —OCH$_2$—, —OCF$_2$—, —CH$_2$O—, or —CF$_2$O— are preferable, and the oxygen atom is preferably disposed to be linked to the 2,3-difluorobenzene-1,4-diyl group.

$n^1+n^2$ is preferably 2 or less, and in a case where emphasis is placed on viscosity reduction, 1 is preferable, and in a case where emphasis is placed on $T_{NI}$ or emphasis is placed on increasing Δn, 2 is preferable.

The compound represented by General Formula (IV) is preferably selected from the group of compounds represented by the following General Formulas (IVa1) and (IVa2).

[Chem. 23]

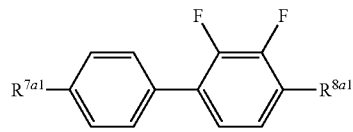

(IVa1)

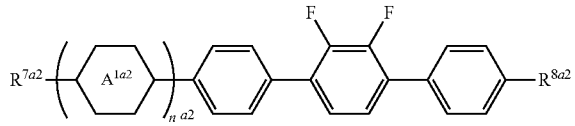

(IVa2)

In the formulas, $R^{7a1}$ and $R^{7a2}$ and $R^{8a1}$ and $R^{8a2}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, alkenyl group, alkoxy group, or alkenyloxy group may be substituted with a fluorine atom, and the methylene group in the alkyl group, the alkenyl group, the alkoxy group or the alkenyloxy group may be substituted with an oxygen atom as long as the oxygen atom is not bonded consecutively and may be substituted with a carbonyl group as long as the carbonyl group is not bonded consecutively, $n^{a2}$ represents 0 or 1, $A^{1a2}$ represents a 1,4-cyclohexylene group, a 1,4-phenylene group, or a tetrahydropyran-2,5-diyl group, and one or more hydrogen atoms in the 1,4-phenylene group in General Formula (IVa1) and General Formula (IVa2) may be substituted with a fluorine atom.

Specific examples of the compound represented by General Formula (IVa1) are preferably the compounds represented by the following formulas (IVa1-1) to (IVa1-9).

[Chem. 24]

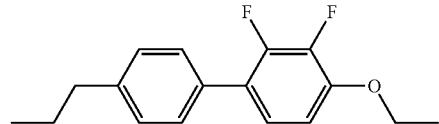 [SMILES: CCCc1ccc(-c2ccc(OCC)c(F)c2F)cc1]

(IVa1-1)

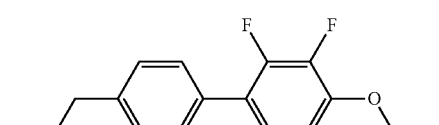

(IVa1-2)

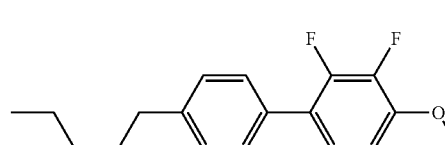

(IVa1-3)

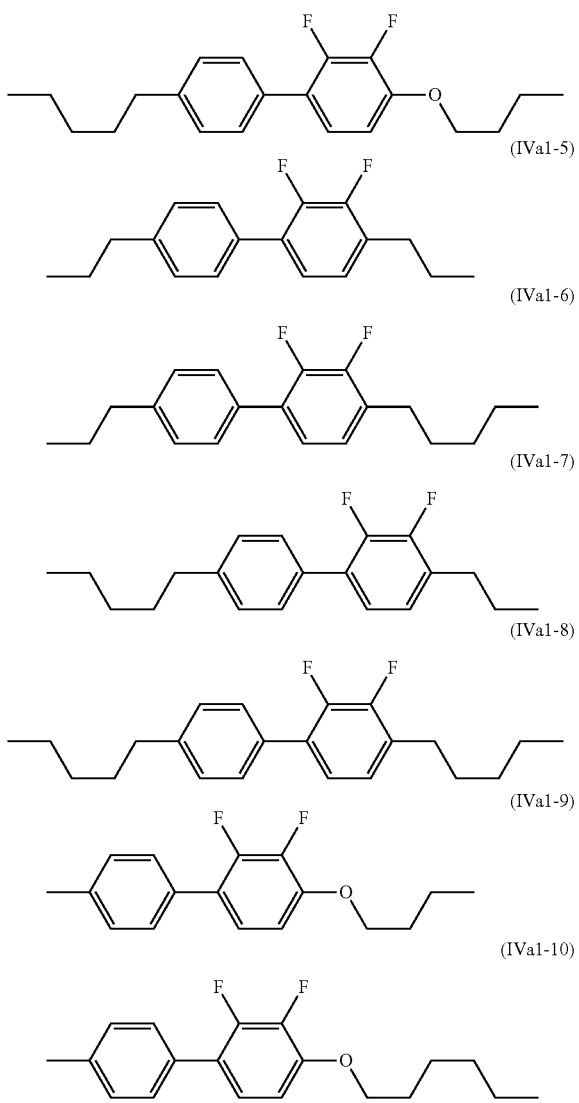

(IVa1-4)
(IVa1-5)
(IVa1-6)
(IVa1-7)
(IVa1-8)
(IVa1-9)
(IVa1-10)

In addition, the compounds represented by formula (IVa1-1) to formula (IVa1-4), formula (IVa1-9), and formula (IVa1-10) are preferable, compounds represented by formula (IVa1-1), formula (IVa1-3), formula (IVa1-9), and (IVa1-10) are more preferable, compounds represented by formula (IVa1-1) and formula (IVa1-9) are more preferable, and the compound represented by formula (IVa1-1) is particularly preferable.

In a case where four or more types of the compounds represented by General Formula (IVa1), it is preferable to use a combination of compounds represented by formula (IVa1-1) to formula (IVa1-4), formula (IVa1-9), and formula (IVa1-10), the content of the compound represented by formula (IVa1-1) to formula (IVa1-4), formula (IVa1-9), and formula (IVa1-10) is preferably 50% by mass or more in the compound represented by General Formula (IVa1), more preferably 70% by mass or more, more preferably 80% by mass or more, particularly preferably 85% by mass or more, and most preferably 90% by mass or more.

In a case where three types of the compounds represented by General Formula (IVa1) are used, it is preferable to use a combination of compounds represented by formula (IVa1-1), formula (IVa1-3), or formula (IVa1-9), the content of the compound represented by formula (IVa1-1), formula (IVa1-3), or formula (IVa1-9) is preferably 50% by mass or more in the compound represented by General Formula (IVa1), more preferably 70% by mass or more, more preferably 80% by mass or more, particularly preferably 85% by mass or more, and most preferably 90% by mass or more.

In a case where two types of the compounds represented by General Formula (IVa1) are used, it is preferable to use a combination of compounds represented by formula (IVa1-1) and formula (IVa1-3), or a combination of compounds represented by formula (IVa1-1) and formula (IVa1-9), in this case, a combination of the compounds represented by formula (IVa1-1) and formula (IVa1-3) is more preferable, the content of the compound represented by formula (IVa1-1), formula (IVa1-3), and formula (IVa1-9) is preferably 50% by mass or more in the compound represented by General Formula (IVa1), more preferably 70% by mass or more, more preferably 80% by mass or more, particularly preferably 85% by mass or more, and most preferably 90% by mass or more.

Specific examples of the compound represented by General Formula (IVa2) are preferably the compounds represented by the following General Formula (IVa2-1) to General Formula (IVa2-9).

[Chem. 25]

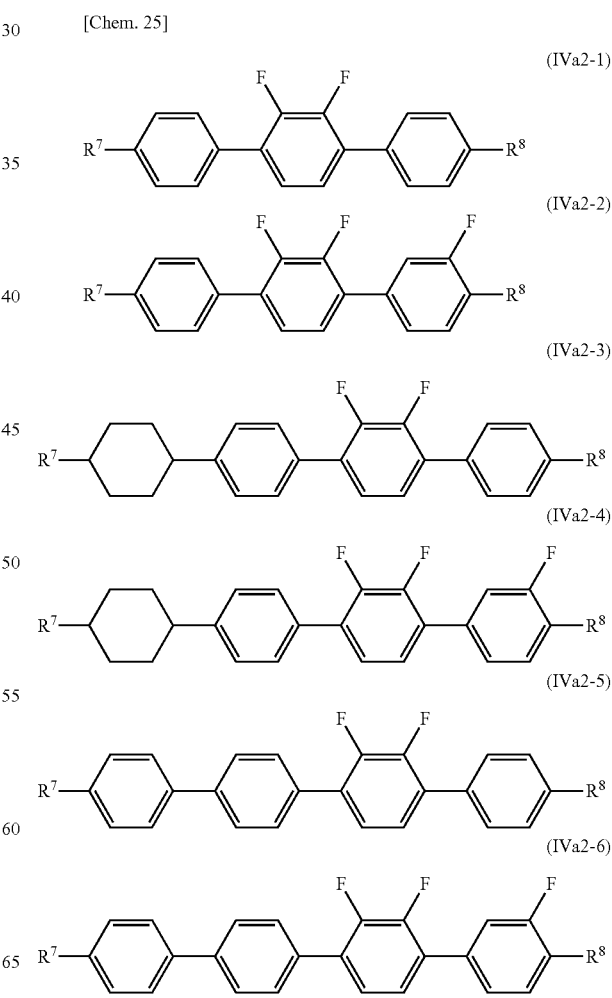

(IVa2-1)
(IVa2-2)
(IVa2-3)
(IVa2-4)
(IVa2-5)
(IVa2-6)

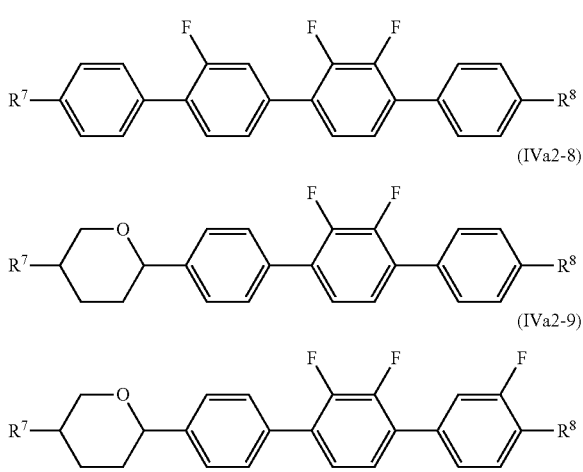

(IVa2-7)

(IVa2-8)

(IVa2-9)

In the formulas, R⁷ has the same meaning as R⁷ in General Formula (IV), and R⁸ has the same meaning as R⁸ in General Formula (IV).

In a case of the compound represented by General Formula (IVa2), it is preferable to use the compound represented by formula (IVa2-1), and the content of the compound represented by formula (IVa2-1) is preferably 50% by mass or more in the compound represented by General Formula (IVa2), more preferably 70% by mass or more, more preferably 80% by mass or more, particularly preferably 85% by mass or more, and most preferably 90% by mass or more.

R⁷ and R⁸ in General Formula (IVa2) each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and preferably represent an alkyl group having 1 to 8 carbon atoms, or an alkenyl group having 2 to 8 carbon atoms, more preferably an alkyl group having 2 to 5 carbon atoms, or an alkenyl group having 2 to 5 carbon atoms, even more preferably an alkyl group having 2 to 5 carbon atoms, and are preferably linear, and in a case where when both of R⁷ and R⁸ are alkyl groups, it is preferable that the number of carbon atoms of each be different.

More specifically, a compound in which R⁷ represents a propyl group and R⁸ represents an ethyl group, or a compound in which R⁷ represents a butyl group and R⁸ represents an ethyl group is preferable.

The 1,4-cyclohexyl group in the present application is preferably a trans-1,4-cyclohexyl group.

It is also possible for the composition of the present invention to further contain a compound having only one ring structure represented by General Formula (V).

[Chem. 26]

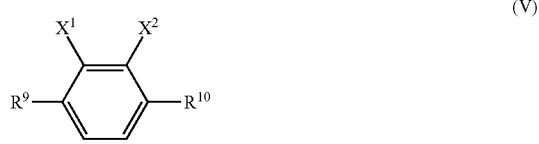

(V)

R⁹ and R¹⁰ each independently represent an alkyl group having 1 to 10 carbon atoms, an alkenyl group having 2 to 10 carbon atoms, an alkoxy group having 1 to 10 carbon atoms, or an alkenyloxy group having 2 to 10 carbon atoms, and X¹ and X² each independently represent an alkyl group having 1 to 3 carbon atoms, a fluorine atom, a hydrogen atom, or a chlorine atom.

R⁹ and R¹⁰ are each independently preferably an alkyl group having 1 to 10 carbon atoms, R⁹ and R¹⁰ are more preferably different, and the total of the number of carbon atoms of the two alkyl groups is preferably 5 or more and 10 or less. In this case, it is preferable that one of the alkyl groups have 5 to 10 carbon atoms and the other have 1 to 5.

X¹ and X² are each independently preferably an alkyl group having 1 to 3 carbon atoms, a fluorine atom or a hydrogen atom, and more preferably a fluorine atom or a hydrogen atom.

Specifically, the compound represented by General Formula (V) is more preferably the compounds shown below.

[Chem. 27]

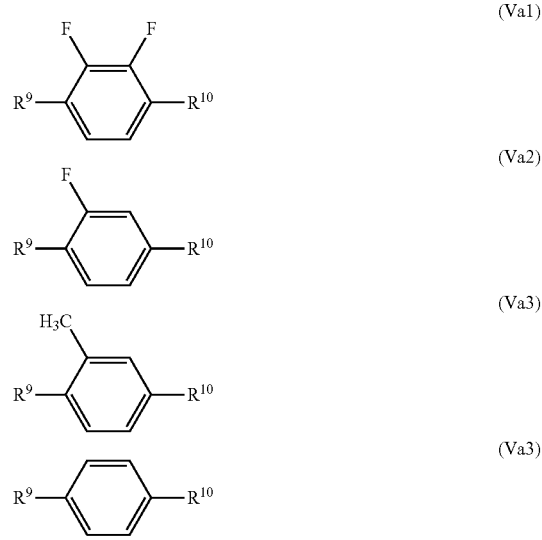

In the formulas, R⁹, R¹⁰, X¹, and X² each independently represent the same meaning as in General Formula (V). Among them, General Formula (Va1) or (Va3) is preferable, and General Formula (Va1) is particularly preferable.

In a case where the compound represented by General Formula (V) is contained, the content thereof is preferably 1 to 10%, more preferably 1 to 8%, particularly preferably 2 to 5.

More specifically, the following compounds are preferable.

[Chem. 28]

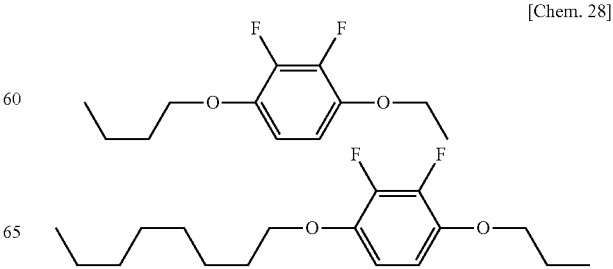

-continued

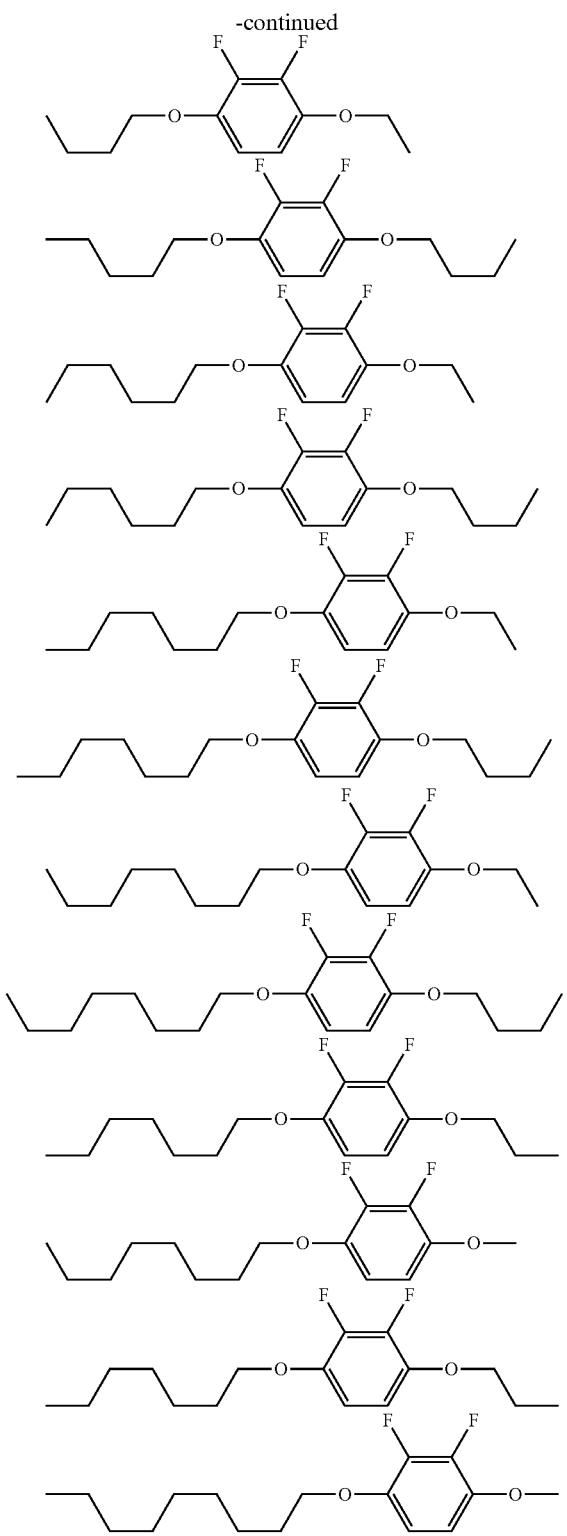

The liquid crystal composition of the present invention contains the compounds represented by the General Formulas (I) and (II) as essential components and is able to further contain compounds represented by General Formula (IV) (however, the compound represented by General Formula (II) is excluded). The total content of the compounds represented by the formula (I), formula (II) and General Formula (IV) contained in the liquid crystal composition is preferably 80 to 100% by mass, more preferably 85 to 100% by mass, still more preferably 90 to 100% by mass, particularly preferably 95 to 100% by mass, and most preferably 97 to 100% by mass.

The lower limit value of the total content of the compounds represented by General Formula (I) and General Formula (II) contained in the liquid crystal composition of the present application is preferably 55% by mass, more preferably 65% by mass, even more preferably 70% by mass, particularly preferably 73% by mass, and most preferably 75% by mass, and the upper limit value is preferably 85% by mass, more preferably 90% by mass, still more preferably 92% by mass, particularly preferably 94% by mass, and most preferably 95% by mass.

It is preferable that the liquid crystal composition of the present invention does not contain a compound having a structure in which oxygen atoms are bonded to each other such as a peracid (—CO—OO—) structure in the molecule.

In a case where emphasis is placed on the reliability and long-term stability of the liquid crystal composition, the content of the compound having a carbonyl group with respect to the total mass of the composition is preferably 5% by mass or less, more preferably 3% by mass or less, more preferably 1% by mass or less, and most preferably substantially not contained.

It is preferable to increase the content of the compound in which all the ring structures in the molecule are 6-membered rings, and the content of the compound in which all the ring structures in the molecule are 6-membered rings is preferably 80% by mass or more with respect to the total mass of the composition, more preferably 90% by mass or more, even more preferably 95% by mass or more, and it is most preferable to form a liquid crystal composition only of the compound in which all the ring structures in the molecule are 6-membered rings.

In order to suppress deterioration due to oxidation of the liquid crystal composition, it is preferable to reduce the content of the compound having a cyclohexenylene group as a ring structure, and the content of the compound having a cyclohexenylene group with respect to the total mass of the composition is preferably 10% by mass or less, more preferably 5% by mass or less, and the compound is even more preferably substantially not contained.

In order to suppress deterioration due to oxidation of the liquid crystal composition, it is preferable to reduce the content of the compound having —CH═CH— as a linking group, and the content of the compound is preferably 10% by mass or less with respect to the total mass of the composition, more preferably 5% by mass or less, and even more preferably substantially not contained.

In a case where emphasis is placed on improving the viscosity and improving the $T_{NI}$, the content of the compound having a 2-methylbenzene-1,4-diyl group in the molecule in which the hydrogen atom may be substituted with a halogen is preferably small, the content of the compound having the 2-methylbenzene-1,4-diyl group in the molecule is preferably 10% by mass or less with respect to the total mass of the composition, more preferably 5% by mass or less, and even more preferably substantially not contained.

In a case where the compound contained in the composition of the present invention has an alkenyl group as a side chain, in a case where the alkenyl group is bonded to cyclohexane, the number of carbon atoms of the alkenyl group is preferably 2 to 5, and in a case where the alkenyl group is bonded to benzene, the number of carbon atoms of the alkenyl group is preferably 4 to 5, and the unsaturated bond of the alkenyl group and benzene are preferably not directly bonded. In addition, in a case where emphasis is placed on the stability of the liquid crystal composition, it is preferable to reduce the content of the compound having an alkenyl group as a side chain and having a 2,3-difluorobenzene-1,4-diyl group, the content of the compound is preferably 10% by mass or less with respect to the total mass of the composition, more preferably 5% by mass or less, and the compound is even more preferably substantially not contained.

The value of the dielectric anisotropy $\Delta\varepsilon$ of the liquid crystal composition of the present invention has negative dielectric anisotropy and the absolute value of dielectric anisotropy is 2 or more. The value of the dielectric anisotropy $\Delta\varepsilon$ at 25° C. is preferably −2.0 to −6.0, more preferably −2.5 to −5.0, and particularly preferably −2.5 to −4.0; however, in more detail, in a case where emphasis is placed on the response speed, −2.5 to −3.4 is preferable, and in a case where emphasis is placed on the driving voltage, −3.4 to −4.0 is preferable.

The value of the refractive index anisotropy $\Delta n$ of the liquid crystal composition in the present invention at 25° C. is preferably 0.08 to 0.13, and more preferably 0.09 to 0.12. More specifically, in a case of corresponding to a thin cell gap, 0.10 to 0.12 is preferable, and in a case of corresponding to a thick cell gap, 0.08 to 0.10 is preferable.

The rotational viscosity ($\gamma_1$) of the liquid crystal composition of the present invention is preferably 150 or less, more preferably 130 or less, particularly preferably 120 or less.

In the liquid crystal composition of the present invention, it is preferable that Z, which is a function of rotational viscosity and refractive index anisotropy, exhibit a specific value.

$$Z = \gamma 1/\Delta n^2 \qquad \text{[Formula 1]}$$

In the formula, $\gamma_1$ represents rotational viscosity and $\Delta n$ represents refractive index anisotropy.

Z is preferably 13,000 or less, more preferably 12,000 or less, and particularly preferably 11,000 or less.

The nematic phase-isotropic liquid phase transition temperature ($T_{NI}$) of the liquid crystal composition of the present invention is 60° C. or more, preferably 75° C. or more, more preferably 80° C. or more, and even more preferably 90° C. or more.

The liquid crystal composition of the present invention needs to have a specific resistance of $10^{12}$ ($\Omega \cdot m$) or more, preferably $10^{13}$ ($\Omega \cdot m$), and more preferably $10^{14}$ ($\Omega \cdot m$) or more.

The liquid crystal composition of the present invention may contain ordinary nematic liquid crystals, smectic liquid crystals, cholesteric liquid crystals, antioxidants, ultraviolet absorbers and the like depending on the application in addition to the compounds described above; however, in a case where chemical stability of the liquid crystal composition is required, it is preferable not to have a chlorine atom in the molecule thereof, and in a case where stability with respect to light such as ultraviolet rays is required in the liquid crystal composition, it is desirable not to have a condensed ring or the like having a long conjugation length and an absorption peak in the ultraviolet region represented by a naphthalene ring or the like in the molecule.

EXAMPLE

Hereinafter, the present invention will be described in more detail with examples, and the present invention is not limited to the Examples. In addition, "%" in the compositions of the following Examples and Comparative Examples means "% by mass".

In the examples, the measured characteristics are as follows.

$T_{NI}$: nematic phase-isotropic liquid phase transition temperature (° C.)

$\Delta n$: refractive index anisotropy at 25° C.

$\Delta\varepsilon$: dielectric anisotropy at 25° C.

$\eta$: viscosity (mPa·s) at 20° C.

$\gamma_1$: rotational viscosity (mPa·s) at 25° C.

Flicker: Using a liquid crystal display electro-optical characteristic evaluation apparatus DMS series manufactured by autronic-MELCHERS (Germany), the flicker rate (%) when a frequency of 60 Hz, an application voltage of 6 V and a 3 V rectangular wave electric field were applied at 25° C.

A Flicker rate 1% or less (extremely good)
B Flicker rate 1 to 2% (acceptable level)
C Flicker rate 2% to 5% (unacceptable level)
D Flicker rate 5% or more (very poor)

VHR: voltage holding ratio (%) at 60° C. under the conditions of a frequency of 60 Hz and an applied voltage of 1 V.

Burn-in:

After displaying a predetermined fixed pattern in the display area for 1,000 hours, by visually inspecting the residual image level of the fixed pattern at the time when full screen was uniformly displayed, the evaluation of the burn-in on a liquid crystal display element was performed on a scale of four stages described below.

A: Residual image was not observed
B: Residual image was very slightly observed, however it was an acceptable level
C: Residual image was observed, and it was an unacceptable level
D: Residual image was observed, and it was a very severe level Drip Marks:

By visually observing drip marks appeared in white when the entire screen was displayed in black, the evaluation of the drip marks on a liquid crystal display device was performed on a scale of four stages described below.

A: Residual image was not observed
B: Residual image was very slightly observed, however it was an acceptable level
C: Residual image was observed, and it was an unacceptable level
D: Residual image was observed, and it was a very severe level Process Adaptability:

In ODF process, dropping the liquid crystal by 50 pL at one time was performed 100,000 times using a constant volume measuring pump, and the change in amount of liquid crystal dropped by each 100 times of the following "0 to 100 times, 101 to 200 times, 201 to 300 times, . . . , 99,901 to 100,000 times" was evaluated on a scale of four stages described below.

A: Change was extremely small (liquid crystal display element could be stably prepared)
B: Change was slightly observed, but it was an acceptable level
C: Change was observed, and it was an unacceptable level (yield was deteriorated by generation of spots)
D: Change was observed, and it was a very severe level (liquid crystal leakage or vacuum bubbles were generated)

Solubility at Low Temperatures:

After preparing a liquid crystal composition, 1 g of the liquid crystal composition was weighed and placed in a sample bottle of 2 mL, the temperature change having one cycle of "−20° C. (maintained for 1 hour)→heating (0.1° C./min)→0° C. (maintained for 1 hour)→heating (0.1° C./min)→20° C. (maintained for 1 hour)→cooling (−0.1° C./min)→0° C. (maintained for 1 hour)→cooling (−0.1° C./min)→−20° C." was continuously given thereto in a temperature controlled test chamber, the generation of precipitates from the liquid crystal composition was visually observed, and the solubility evaluation at low temperatures was performed on a scale of four stages described below.

A: Precipitates were not observed for equal to or longer than 600 hours.
B: Precipitates were not observed for equal to or longer than 300 hours.
C: Precipitates were observed within 150 hours.
D: Precipitates were observed within 75 hours.

Moreover, in the examples, the following abbreviations were used for describing the compounds.

(Side Chain)
-n —$C_nH_{2n+1}$ linear alkyl group having n carbon atoms
—On —$OC_nH_{2n+1}$ linear alkoxy group having n carbon atoms
—V —C=$CH_2$ vinyl group
-Vn —C=C=$C_nH_{2n+1}$ 1-alkene having a number (n+1) of carbon atoms (Ring Structure)

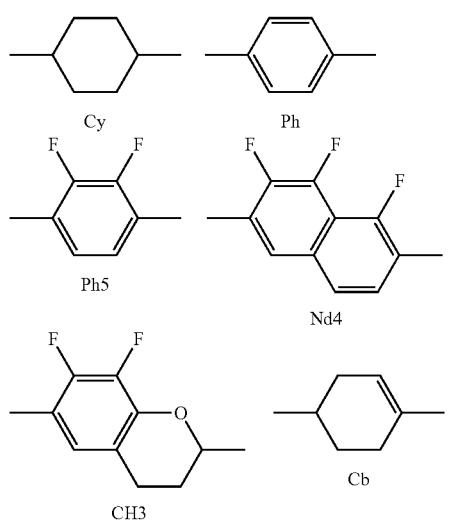

[Chem. 29]

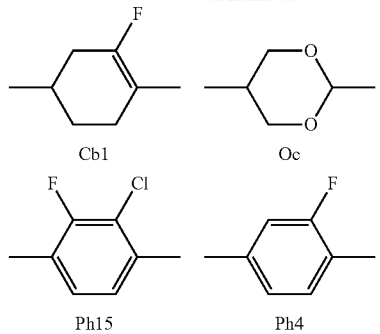

(Structure of Liquid Crystal Display Element)

An FFS mode liquid crystal display element with a cell thickness of 3.0 μm typical for TV use was prepared. The inter-electrode distance R of this display element is 0.5 μm, which is only the film thickness of the insulating film between the pixel electrode and the common electrode, the application voltage E is 15 V, and the value of E/R is 30 V/μm. Injection of the liquid crystal composition was carried out by a dropping method and flicker, burn-in, drip marks, process adaptability, and solubility at low temperature were evaluated.

The film thickness of the insulating film was measured with an electron microscope.

Example 1 (Liquid Crystal Composition 1) and Comparative Example 1

The liquid crystal composition (liquid crystal composition 1) having the composition described below was prepared, and the physical properties thereof were measured. The results are shown in the following Table.

Furthermore, the prepared liquid crystal composition 1 was injected into the liquid crystal display element, and various physical property values and display characteristics were evaluated.

In addition, a liquid crystal composition of Comparative Example 1 having a structure different from that of the liquid crystal composition defined in the present invention was prepared, and a liquid crystal display element was prepared and evaluated in the same manner.

The references on the left side of the content are abbreviations of the compounds described above.

[Chem. 30]

| | |
|---|---|
| (structure) | 3CyCyV 32% |
| (structure) | 3CyCyV1 12% |
| (structure) | 3CyCyPh1 4% |

[Chem. 30]
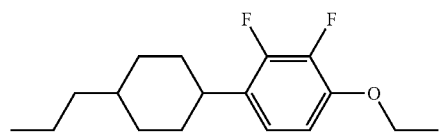 3CyPh5O2 7%
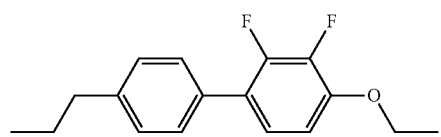 3CyPh5O2 10%
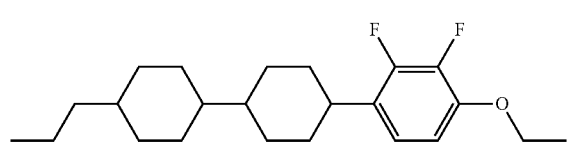 3CyCyPh5O2 10%
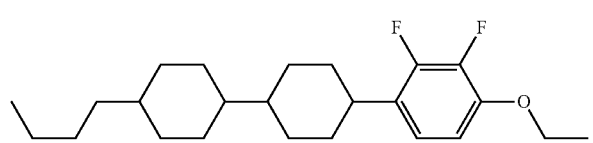 4CyCyPh5O2 2%
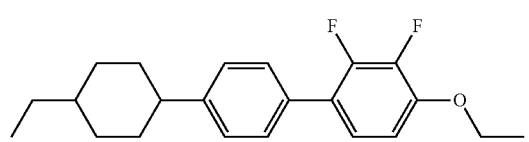 [SMILES: CCOc1ccc(-c2ccc(C3CCC(CC)CC3)cc2)c(F)c1F] 2CyPhPh5O2 5%
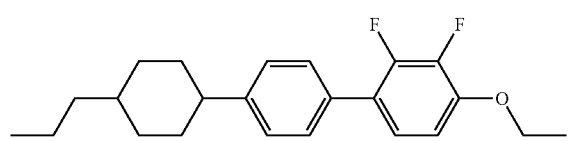 [SMILES: CCCC1CCC(c2ccc(-c3ccc(OCC)c(F)c3F)cc2)CC1] 3CyPhPh5O2 8%
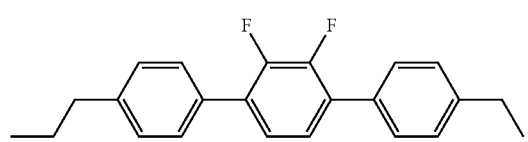 3PhPh5Ph2 5%
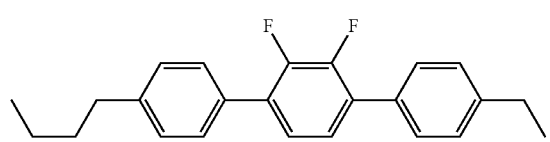 [SMILES: CCCCc1ccc(-c2ccc(-c3ccc(CC)cc3)c(F)c2F)cc1] 3PhPh5Ph2 5%
Example 1
[Chem. 31]
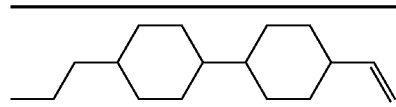 3CyCyV 32%
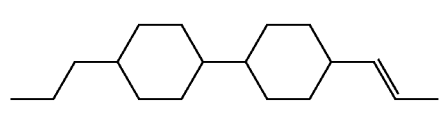 [SMILES: C/C=C/C1CCC(C2CCC(CCC)CC2)CC1] 3CyCyV1 12%
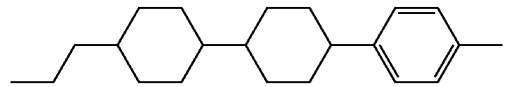 [SMILES: CCCC1CCC(C2CCC(c3ccc(C)cc3)CC2)CC1] 3CyCyPh1 4%

-continued

[Chem. 31]

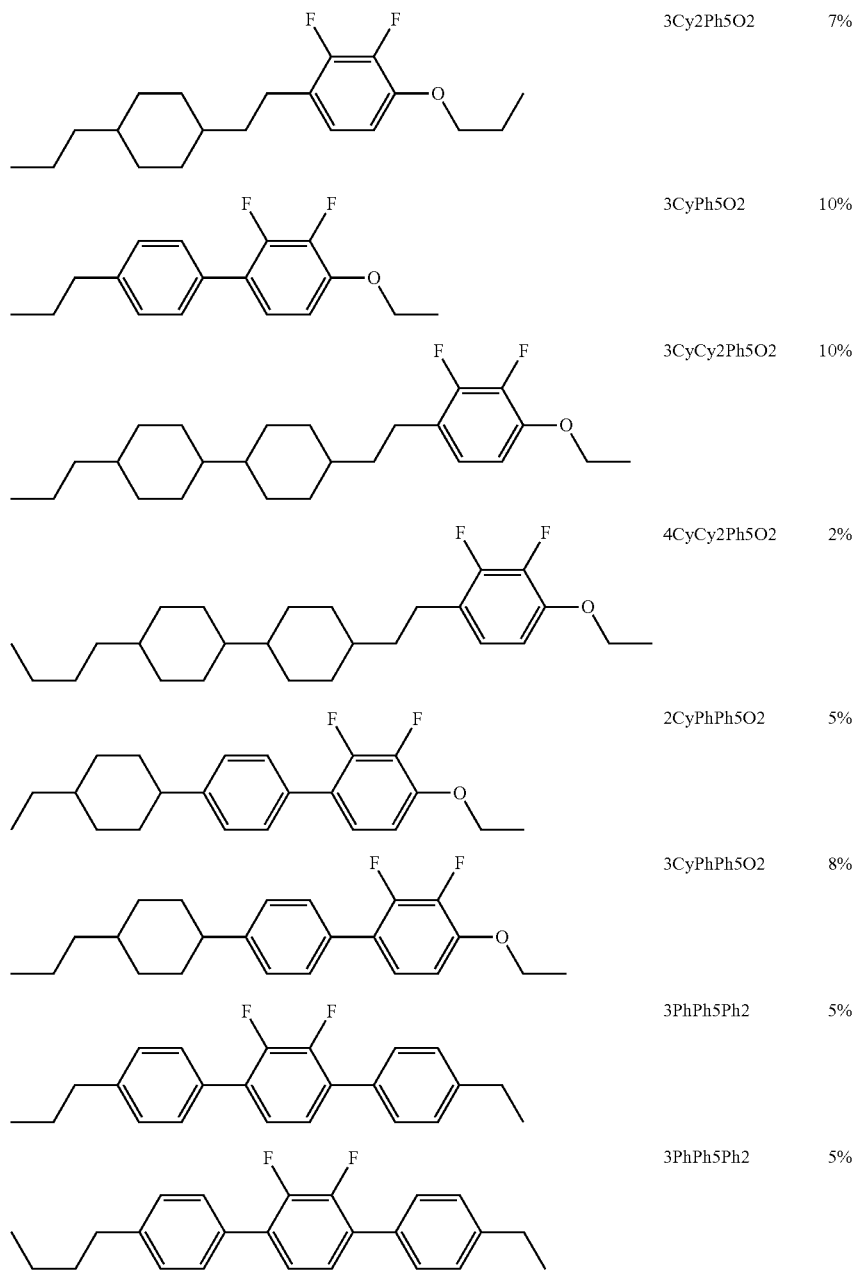

| | | |
|---|---|---|
| 3Cy2Ph5O2 | | 7% |
| 3CyPh5O2 | | 10% |
| 3CyCy2Ph5O2 | | 10% |
| 4CyCy2Ph5O2 | | 2% |
| 2CyPhPh5O2 | | 5% |
| 3CyPhPh5O2 | | 8% |
| 3PhPh5Ph2 | | 5% |
| 3PhPh5Ph2 | | 5% |

Comparative Example 1

TABLE 1

| Sample Name | Example 1 | Comparative Example 1 |
|---|---|---|
| $T_{NI}/°$ C. | 76.6 | 76.2 |
| $\Delta n$ | 0.110 | 0.108 |
| $\Delta\varepsilon$ | −3.03 | −2.74 |
| $\eta$/mPa · s | 13.6 | 12.0 |
| $\gamma_1$/mPa · s | 90 | 94 |

TABLE 1-continued

| Sample Name | Example 1 | Comparative Example 1 |
|---|---|---|
| $\gamma_1/\Delta n^2$ | 7.4 | 8.1 |
| $\gamma_1/\Delta n^2/|\Delta\varepsilon|$ | 2.45 | 2.94 |
| 3-Cy-Cy-V | 32 | 32 |
| 3-Cy-Cy-V1 | 12 | 12 |
| 3-Cy-Cy-Ph-1 | 4 | 4 |
| 3-Cy-Ph5—O2 | 7 | |
| 3-Ph—Ph5—O2 | 10 | 10 |
| 3-Cy-Cy-Ph5—O2 | 10 | |
| 4-Cy-Cy-Ph5—O2 | 2 | |

TABLE 1-continued

| Sample Name | Example 1 | Comparative Example 1 |
|---|---|---|
| 2-Cy-Ph—Ph5—O2 | 5 | 5 |
| 3-Cy-Ph—Ph5—O2 | 8 | 8 |
| 3-Ph—Ph5—Ph-2 | 5 | 5 |
| 4-Ph—Ph5—Ph-2 | 5 | 5 |
| 3-Cy-2-Ph5—O3 | | 7 |
| 3-Cy-Cy-2-Ph5—O4 | | 10 |
| 4-Cy-Cy-2-Ph5—O2 | | 2 |
| Transmission rate (n-FFS)/% | 90 | 88 |
| Contrast ratio (n-FFS) | 293 | 265 |
| Response speed (n-FFS)/ms | 4.4 | 4.8 |
| Flicker | B | D |
| Flicker (low application voltage) | A | C |

It is understood that the liquid crystal composition 1 has a $T_{NI}$ of 76.6° C., which is practical in terms of a liquid crystal composition for TVs, a large absolute value of $\Delta\varepsilon$, and a low η and an optimum $\Delta n$. An FFS mode liquid crystal display element was prepared using the liquid crystal composition 1 and flicker was evaluated by the method described above, and the evaluation results were extremely excellent.

On the other hand, it was understood that the liquid crystal display element of Comparative Example 1 was slightly inferior in the points of transmittance, contrast, and response speed, but was inferior to the display element of Example 1 in terms of flicker characteristics.

Example 2 (Liquid Crystal Composition 2) and Comparative Example 2

A liquid crystal composition (liquid crystal composition 2) and a liquid crystal composition of Comparative Example 1 having the following compositions were prepared, the FFS mode liquid crystal display element was prepared in the same manner, and the physical property values thereof were measured. The results are shown in the following table.

In addition, a liquid crystal composition of Comparative Example 2 having a structure different from that of the liquid crystal composition defined in the present invention was prepared, and a liquid crystal display element was prepared and evaluated in the same manner.

TABLE 2

| Sample Name | Example 2 | Comparative Example 2 |
|---|---|---|
| $T_{NI}$/° C. | 86.5 | 89.7 |
| $\Delta n$ | 0.110 | 0.088 |
| $\Delta\varepsilon$ | −3.90 | −3.32 |
| η/mPa · s | 22.0 | 21.0 |
| $\gamma_1$/mPa · s | 144 | 162 |
| $\gamma_1/\Delta n^2$ | 11.9 | 20.9 |
| $\gamma_1/\Delta n^2/|\Delta\varepsilon|$ | 3.05 | 6.30 |
| 3-Cy-Cy-V | 16 | 16 |
| 3-Cy-Cy-V1 | 10 | 10 |
| 3-Ph—Ph-1 | 5 | 5 |
| 3-Cy-Cy-Ph-1 | 6 | 6 |
| 3-Cy-Ph5—O2 | 10 | |
| 5-Cy-Ph5—O2 | 5 | |
| 3-Ph—Ph5—O2 | 5 | |
| 3-Cy-Cy-Ph5—O2 | 11 | 11 |
| 3-Cy-Ph5—O3 | 9 | 9 |
| 4-Cy-Ph5—O2 | 11 | 11 |
| 2-Cy-Ph—Ph5—O2 | 2 | |
| 3-Cy-Ph—Ph5—O2 | 4 | |
| 3-Ph—Ph5—Ph-2 | 6 | |
| 3-Cy-2-Ph5—O3 | | 10 |
| 4-Cy-2-Ph5—O2 | | 10 |
| 3-Cy-Cy-2-Ph5—O4 | | 6 |
| 4-Cy-Cy-2-Ph5—O2 | | 6 |
| Transmission rate (n-FFS)/% | 88 | 85 |
| Contrast ratio (n-FFS) | 286 | 254 |
| Response speed (n-FFS)/ms | 6.1 | 7.8 |
| Flicker | B | D |
| Flicker (low application voltage) | A | D |

It is understood that the liquid crystal composition 2 has a practical liquid crystal phase temperature range in terms of a liquid crystal composition for TVs, has a large absolute value of dielectric anisotropy, and has a low viscosity and optimum $\Delta n$.

It is understood that the liquid crystal display element of Comparative Example 2 was slightly inferior in the points of transmittance, contrast, and response speed, but the flicker characteristic was inferior to the display element of Example 2.

Examples 3 to 8

Liquid crystal compositions of Examples 3 to 8 having the following compositions were prepared, FFS mode display elements were prepared and the physical property values thereof were measured in the same manner. The results are shown in the following table.

TABLE 3

| | Sample Name | | | | | |
|---|---|---|---|---|---|---|
| | Example 3 | Example 4 | Example 5 | Example 6 | Example 7 | Example 8 |
| $T_{NI}$/° C. | 76.1 | 86.5 | 75.6 | 85.7 | 76.9 | 74.5 |
| $\Delta n$ | 0.110 | 0.109 | 0.109 | 0.110 | 0.110 | 0.109 |
| $\Delta\varepsilon$ | −3.09 | −3.84 | −3.07 | −3.87 | −2.99 | −2.73 |
| η/mPa · s | 12.2 | 19.5 | 15.2 | 23.4 | 13.5 | 13.4 |
| $\gamma_1$/mPa · s | 81 | 126 | 98 | 153 | 89 | 88 |
| $\gamma_1/\Delta n^2$ | 6.7 | 10.6 | 8.2 | 12.6 | 7.4 | 7.4 |
| $\gamma_1/\Delta n^2/|\Delta\varepsilon|$ | 2.17 | 2.76 | 2.69 | 3.27 | 2.46 | 2.71 |
| 3-Cy-Cy-V | 35 | 19 | 31 | 17 | 32 | 32 |
| 3-Cy-Cy-V1 | 12 | 10 | 11 | 10 | 12 | 12 |
| 3-Ph-Ph-1 | | 5 | | 5 | | |
| 3-Cy-Cy-Ph-1 | 2 | 9 | | 2 | 4 | 4 |
| 3-Cy-Ph-Ph-2 | 6 | | | | | |

TABLE 3-continued

| | Sample Name | | | | | |
|---|---|---|---|---|---|---|
| | Example 3 | Example 4 | Example 5 | Example 6 | Example 7 | Example 8 |
| 3-Cy-Ph5-O2 | 4 | 8 | 13 | 12 | 7 | 7 |
| 5-Cy-Ph5-O2 | | 3 | 6 | 7 | | |
| 1-Ph-Ph5-O4 | | | | | 10 | |
| 3-Ph-Ph5-O2 | 10 | 8 | | | | 10 |
| 5-Ph-Ph5-O2 | 4 | | | | | |
| 3-Cy-Cy-Ph5-3 | | | | | | 12 |
| 3-Cy-Cy-Ph5-O2 | 3 | 11 | 11 | 10 | 10 | |
| 3-Cy-Cy-Ph5-O3 | | 2 | | 9 | | |
| 4-Cy-Cy-Ph5-O2 | | | 9 | 10 | 2 | |
| 2-Cy-Ph-Ph5-O2 | 12 | 7 | 5 | 4 | 5 | 5 |
| 3-Cy-Ph-Ph5-O2 | 12 | 9 | 10 | 6 | 8 | 8 |
| 3-Ph-Ph5-Ph-2 | | | 13 | 4 | 5 | 5 |
| 4-Ph-Ph5-Ph-2 | | | | 4 | 5 | 5 |
| Transmission rate (n-FFS)/% | 90 | 89 | 89 | 88 | 89 | 90 |
| Contrast ratio (n-FFS) | 302 | 295 | 289 | 279 | 288 | 290 |
| Response speed (n-FFS)/ms | 3.7 | 5.8 | 4.7 | 8.0 | 4.2 | 4.3 |
| Flicker | B | A | B | A | B | A |
| Flicker (low application voltage) | A | A | A | A | A | A |

It is understood that the liquid crystal display elements of Examples 3 to 8 also have practical characteristics in terms of liquid crystal TVs, and effectively reduce the flicker characteristic of the FFS mode.

Examples 9 to 16

Liquid crystal compositions of Examples 9 to 16 having the compositions shown below were prepared, FFS mode display elements were prepared and the physical property values thereof were measured in the same manner. The results are shown in the following table.

TABLE 4

| | Sample Name | | | | | | | |
|---|---|---|---|---|---|---|---|---|
| | Example 9 | Example 10 | Example 11 | Example 12 | Example 13 | Example 14 | Example 15 | Example 16 |
| $T_{NI}/°C$ | 75.8 | 85.3 | 78.1 | 85.7 | 75.9 | 85.5 | 76.0 | 73.3 |
| $\Delta n$ | 0.108 | 0.110 | 0.101 | 0.110 | 0.104 | 0.111 | 0.108 | 0.107 |
| $\Delta \varepsilon$ | -3.17 | -3.94 | -3.00 | -3.96 | -3.06 | -4.03 | -3.13 | -2.80 |
| $\eta$/mPa·s | 18.5 | 25.5 | 15.9 | 23.5 | 19.9 | 27.6 | 18.4 | 18.2 |
| $\gamma_1$/mPa·s | 131 | 180 | 111 | 160 | 137 | 188 | 130 | 129 |
| $\gamma_1/\Delta n^2$ | 11.2 | 14.9 | 10.9 | 13.2 | 12.7 | 15.3 | 11.1 | 11.3 |
| $\gamma_1/\Delta n^2/|\Delta\varepsilon|$ | 3.54 | 3.78 | 3.63 | 3.34 | 4.14 | 3.79 | 3.56 | 4.02 |
| 3-Cy-Cy-2 | 25 | 20 | 25 | 20 | 25 | 18 | 25 | 25 |
| 3-Cy-Cy-4 | 10 | 5 | 10 | 3 | 8 | 3 | 10 | 10 |
| 3-Cy-Cy-5 | 5 | | 6 | | 5 | | 5 | 5 |
| 3-Ph-Ph-1 | | 5 | | 5 | | 5 | | |
| 3-Cy-Cy-Ph-1 | | 2 | 10 | 10 | | 4 | | |
| 3-Cy-Ph5-O2 | 8 | 7 | 5 | 8 | 10 | 11 | 8 | 8 |
| 5-Cy-Ph5-O2 | | 4 | | 5 | 9 | 9 | | |
| 1-Ph-Ph5-O4 | | | | | | | 9 | |
| 3-Ph-Ph5-O2 | 9 | 6 | 10 | 7 | | | | 9 |
| 5-Ph-Ph5-O2 | | | 4 | | | | | |
| 3-Cy-Cy-Ph5-3 | | | | | | | | 14 |
| 3-Cy-Cy-Ph5-O2 | 12 | 11 | 6 | 8 | 11 | 10 | 12 | |
| 3-Cy-Cy-Ph5-O3 | | 10 | | 3 | | 7 | | |
| 4-Cy-Cy-Ph5-O2 | 2 | 11 | | 9 | | 10 | 2 | |
| 2-Cy-Ph-Ph5-O2 | 9 | 5 | 12 | 10 | 10 | 7 | 9 | 9 |
| 3-Cy-Ph-Ph5-O2 | 9 | 7 | 12 | 12 | 11 | 9 | 9 | 9 |
| 3-Ph-Ph5-Ph-2 | 5 | 3 | | | 5 | 3 | 5 | 5 |
| 4-Ph-Ph5-Ph-2 | 6 | 4 | | | 6 | 4 | 6 | 6 |
| Flicker | A | B | A | A | A | B | A | A |
| Flicker (low application voltage) | A | A | A | A | A | A | A | A |

It is understood that the liquid crystal display elements of Examples 9 to 16 also have practical characteristics in terms of a liquid crystal TV, and effectively reduce the flicker characteristic of the FFS mode. Furthermore, it was also found that these display elements have comparatively high reliability.

Examples 9 to 16

Liquid crystal compositions of Examples 17 and 18 having the compositions shown below were prepared, FFS mode display elements were prepared and the physical property values thereof were measured in the same manner. The results are shown in the following table.

TABLE 5

| Sample Name | Example 17 | Example 18 |
|---|---|---|
| $T_{NI}/° C.$ | 85.8 | 85.0 |
| Δn | 0.103 | 0.103 |
| Δε | −4.02 | −4.04 |
| η/mPa · s | 20.9 | 24.3 |
| $γ_1$/mPa · s | 123 | 152 |
| $γ_1/Δn^2$ | 11.6 | 14.3 |
| $γ_1/Δn^2/|Δε|$ | 2.88 | 3.55 |
| 3-Cy-Cy-2 |  | 22 |
| 3-Cy-Cy-4 |  | 3 |
| 3-Cy-Cy-V | 20 |  |
| 3-Cy-Cy-V1 | 10 |  |
| 3-Cy-Cy-Ph-1 | 7 | 7 |
| 3-Cy-Ph—Ph-2 | 3 | 4 |
| 3-Cy-Ph5—O2 | 13 | 13 |
| 5-Cy-Ph5—O2 | 12 | 12 |
| 3-Cy-Cy-Ph5—O2 | 10 | 9 |
| 4-Cy-Cy-Ph5—O2 | 5 | 6 |
| 2-Cy-Ph—Ph5—O2 | 10 | 12 |
| 3-Cy-Ph—Ph5—O2 | 10 | 12 |
| Flicker | A | A |
| Flicker (low application voltage) | A | A |

It is understood that the liquid crystal display elements of Examples 17 and 18 also have practical characteristics in terms of a liquid crystal TV, and effectively reduce the flicker characteristic of the FFS mode.

REFERENCE SIGNS LIST

1, 8 POLARIZING PLATE
2 FIRST SUBSTRATE
3 ELECTRODE LAYER
4 ALIGNMENT FILM
5 LIQUID-CRYSTAL LAYER
6 COLOR FILTER
7 SECOND SUBSTRATE
11 GATE ELECTRODE
12 GATE INSULATING FILM
13 SEMICONDUCTOR LAYER
14 INSULATING LAYER
15 OHMIC CONTACT LAYER
16 DRAIN ELECTRODE
17 SOURCE ELECTRODE
18 INSULATING PROTECTIVE LAYER
21 PIXEL ELECTRODE
22 COMMON ELECTRODE
23 STORAGE CAPACITOR
25 DATA BUS LINE
27 SOURCE BUS LINE
29 COMMON LINE

The invention claimed is:
1. A liquid crystal display element comprising:
a first transparent insulating substrate and a second transparent insulating substrate, which are disposed so as to face each other;
a liquid crystal layer containing a liquid crystal composition, which is interposed between the first substrate and the second substrate;
for each pixel on the first substrate, a common electrode containing a transparent conductive material, a plurality of gate bus lines and data bus lines disposed in a matrix shape on; a thin film transistor provided at an intersection between the gate bus lines and data bus lines, and a pixel electrode containing a transparent conductive material, which is driven by the transistor; and
alignment layer which induce homogeneous alignment between the liquid crystal layer and each of the first and second substrates,
wherein an inter-electrode distance R (μm) between the pixel electrode and the common electrode and an application voltage E(V) satisfy the following two relationships:

$E/R ≥ 3(V/μm)$ and $E ≤ 15(V)$, the liquid crystal composition has negative dielectric anisotropy; a transition temperature of the nematic phase-isotropic liquid of 60° C. or more; and a dielectric anisotropy absolute value of 1.5 or more, and
the liquid crystal display element contains at least one compound selected from the group of compounds represented by General Formula (I):

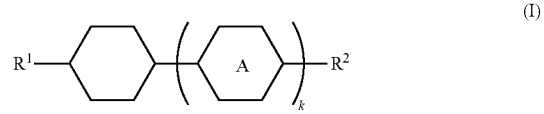

(wherein $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, A represents a 1,4-phenylene group or a trans-1,4-cyclohexylene group, k represents 1 or 2, provided that in a case where k is 2, two A's may be the same or different); and
at least one compound selected from the group of compounds represented by the following General Formula (II):

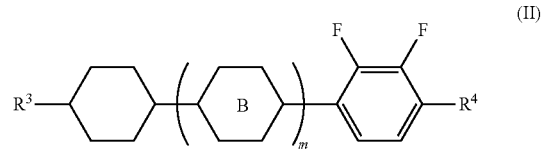

(wherein $R^3$ is an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, and B represents a 1,4-phenylene group or a trans-1,4-cyclohexylene group, and m represents 0, 1 or 2, provided that, in a case where m is 2, two B's may be the same or different).

2. The liquid crystal display element according to claim 1, which satisfies the following two relationships:

$E/R \geq 10(V/\mu m)$ and $E \leq 10(V)$.

3. The liquid crystal display element according to claim 1, wherein a horizontal inter-electrode distance Rh between the pixel electrode and the common electrode in a substrate direction is 0.

4. The liquid crystal display element according to claim 1, further comprising at least one compound selected from the group of compounds represented by the following General Formula (III) as the compound represented by General Formula (I):

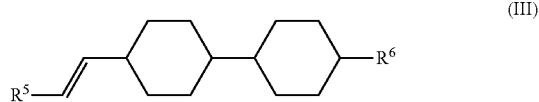

(III)

wherein $R^5$ represents a hydrogen atom or a methyl group, and $R^6$ represents an alkyl group having 1 to 5 carbon atoms, an alkenyl group having 2 to 5 carbon atoms, or an alkoxy group having 1 to 4 carbon atoms.

5. The liquid crystal display element according to claim 1, further comprising one or more of compounds represented by the following General Formula (IV):

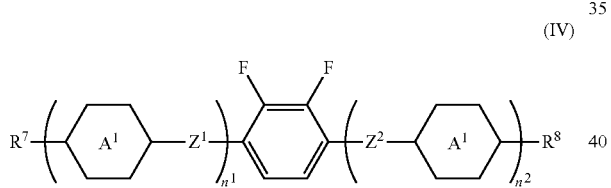

(IV)

wherein $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and one or more hydrogen atoms in the alkyl group, alkenyl group, alkoxy group, or alkenyloxy group may be substituted with a fluorine atom, a methylene group in the alkyl group, the alkenyl group, the alkoxy group, or the alkenyloxy group may be substituted with an oxygen atom as long as the oxygen atom is not bonded consecutively, and may be substituted with an carbonyl group as long as the carbonyl group is not bonded consecutively, $A^1$ and $A^2$ each independently represent a 1,4-cyclohexylene group, a 1,4-phenylene group, or a tetrahydropyran-2,5-diyl group, but in a case where $A^1$ or/and $A^2$ represent a 1,4-phenylene group, one or more hydrogen atoms in the 1,4-phenylene group may be substituted with a fluorine atom, $Z^1$ and $Z^2$ each independently represent a single bond, —OCH$_2$—, —OCF$_2$—, —CH$_2$O—, or CF$_2$O—, $n^1$ and $n^2$ each independently represent 0, 1, 2 or 3, provided that $n^1 + n^2$ is 1 to 3, and in the case where plural groups with respect to $A^1, A^2, Z^1$ or $Z^2$ are present, the plural groups may be the same or different, with the proviso that compounds where $n^1$ is 1 or 2, $n^2$ is 0, at least one of $A^1$ is a 1,4-cyclohexylene group, and all $Z^1$ are single bonds are excluded.

6. The liquid crystal display element according to claim 3 further comprising at least one compound selected from the group of compounds represented by the following General Formula (IVa1) and General Formula (IVa2) as the compound represented by General Formula (IV):

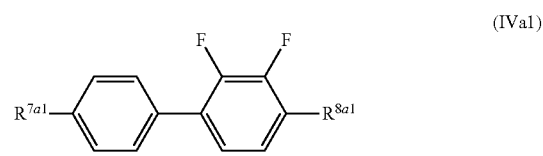

(IVa1)

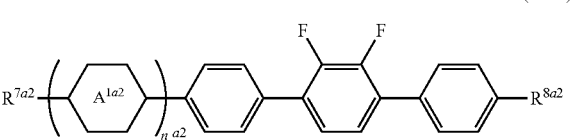

(IVa2)

wherein $R^{7a1}$ and $R^{7a2}$ and $R^{8a1}$ and $R^{8a2}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, alkenyl group, alkoxy group, or alkenyloxy group may be substituted with a fluorine atom, a methylene group in the alkyl group, alkenyl group, alkoxy group or alkenyloxy group may be substituted with an oxygen atom as long as an oxygen atom is not bonded consecutively to another oxygen atom and may be substituted with a carbonyl group as long as a carbonyl group is not bonded consecutively to another carbonyl group, $n^{a2}$ represents 0 or 1, $1^{a2}$ represents a 1,4-cyclohexylene group, a 1,4-phenylene group, or a tetrahydropyran-2, 5-diyl group, and one or more hydrogen atoms in the 1,4-phenylene group in General Formula (IVa1) and General Formula (IVa2) may be substituted with a fluorine atom.

7. The liquid crystal display element according to claim 1, wherein the pixel electrode has a comb shape or has a slit.

* * * * *